United States Patent
Vallabhan et al.

(10) Patent No.: US 9,838,784 B2
(45) Date of Patent: Dec. 5, 2017

(54) DIRECTIONAL AUDIO CAPTURE

(71) Applicant: Knowles Electronics, LLC, Itasca, IL (US)

(72) Inventors: Harinarayanan Erumbi Vallabhan, Bangalore (IN); Shailesh Sakri, Fremont, CA (US); Carlos Avendano, Campbell, CA (US); Ludger Solbach, San Jose, CA (US)

(73) Assignee: Knowles Electronics, LLC, Itasca, IL (US)

( * ) Notice: Subject to any disclaimer, the term of this patent is extended or adjusted under 35 U.S.C. 154(b) by 71 days.

(21) Appl. No.: 14/957,447

(22) Filed: Dec. 2, 2015

(65) Prior Publication Data

US 2016/0094910 A1   Mar. 31, 2016

Related U.S. Application Data

(63) Continuation-in-part of application No. 12/896,725, filed on Oct. 1, 2010, now Pat. No. 9,210,503.
(Continued)

(51) Int. Cl.
*H04R 3/00* (2006.01)
*H04M 1/03* (2006.01)

(52) U.S. Cl.
CPC .............. *H04R 3/005* (2013.01); *H04M 1/03* (2013.01); *H04R 2201/405* (2013.01); *H04R 2430/20* (2013.01); *H04R 2430/21* (2013.01)

(58) Field of Classification Search
CPC .............. H04R 3/005; H04R 2201/405; H04R 2430/20; H04R 2430/21; H04R 2430/23; H04R 2430/25
(Continued)

(56) References Cited

U.S. PATENT DOCUMENTS

| 4,025,724 A | 5/1977 | Davidson, Jr. et al. |
| 4,137,510 A | 1/1979 | Iwahara |

(Continued)

FOREIGN PATENT DOCUMENTS

| CN | 105474311 A | 4/2016 |
| DE | 112014003337 T5 | 3/2016 |

(Continued)

OTHER PUBLICATIONS

Final Office Action, dated Jan. 12, 2016, U.S. Appl. No. 12/959,994, filed Dec. 3, 2010.
(Continued)

*Primary Examiner* — David Ton
(74) *Attorney, Agent, or Firm* — Foley & Lardner LLP

(57) ABSTRACT

Systems and methods for improving performance of a directional audio capture system are provided. An example method includes correlating phase plots of at least two audio inputs, with the audio inputs being captured by at least two microphones. The method can further include generating, based on the correlation, estimates of salience at different directional angles to localize a direction of a source of sound. The method can allow providing cues to the directional audio capture system based on the estimates. The cues include attenuation levels. A rate of change of the levels of attenuation is controlled by attack and release time constants to avoid sound artifacts. The method also includes determining a mode based on an absence or presence of one or more peaks in the estimates of salience. The method also provides for configuring the directional audio capture system based on the determined mode.

19 Claims, 10 Drawing Sheets

Related U.S. Application Data

(60) Provisional application No. 61/266,131, filed on Dec. 2, 2009, provisional application No. 60/098,247, filed on Dec. 30, 2014.

(58) Field of Classification Search
USPC .................................................. 381/92
See application file for complete search history.

(56) References Cited

U.S. PATENT DOCUMENTS

| | | | |
|---|---|---|---|
| 4,802,227 A | 1/1989 | Elko et al. |
| 4,969,203 A | 11/1990 | Herman |
| 5,115,404 A | 5/1992 | Lo et al. |
| 5,204,906 A | 4/1993 | Nohara et al. |
| 5,224,170 A | 6/1993 | Waite, Jr. |
| 5,230,022 A | 7/1993 | Sakata |
| 5,289,273 A | 2/1994 | Lang |
| 5,400,409 A | 3/1995 | Linhard |
| 5,440,751 A | 8/1995 | Santeler et al. |
| 5,544,346 A | 8/1996 | Amini et al. |
| 5,555,306 A | 9/1996 | Gerzon |
| 5,583,784 A | 12/1996 | Kapust et al. |
| 5,598,505 A | 1/1997 | Austin et al. |
| 5,625,697 A | 4/1997 | Bowen et al. |
| 5,682,463 A | 10/1997 | Allen et al. |
| 5,715,319 A | 2/1998 | Chu |
| 5,734,713 A | 3/1998 | Mauney et al. |
| 5,774,837 A | 6/1998 | Yeldener et al. |
| 5,796,850 A | 8/1998 | Shiono et al. |
| 5,806,025 A | 9/1998 | Vis et al. |
| 5,819,215 A | 10/1998 | Dobson et al. |
| 5,850,453 A | 12/1998 | Klayman et al. |
| 5,937,070 A | 8/1999 | Todter et al. |
| 5,956,674 A | 9/1999 | Smyth et al. |
| 5,974,379 A | 10/1999 | Hatanaka et al. |
| 5,974,380 A | 10/1999 | Smyth et al. |
| 5,978,567 A | 11/1999 | Rebane et al. |
| 5,978,824 A | 11/1999 | Ikeda |
| 5,991,385 A | 11/1999 | Dunn et al. |
| 6,011,853 A | 1/2000 | Koski et al. |
| 6,035,177 A | 3/2000 | Moses et al. |
| 6,065,883 A | 5/2000 | Herring et al. |
| 6,084,916 A | 7/2000 | Ott |
| 6,104,993 A | 8/2000 | Ashley |
| 6,144,937 A | 11/2000 | Ali |
| 6,188,769 B1 | 2/2001 | Jot et al. |
| 6,202,047 B1 | 3/2001 | Ephraim et al. |
| 6,219,408 B1 | 4/2001 | Kurth |
| 6,226,616 B1 | 5/2001 | You et al. |
| 6,240,386 B1 | 5/2001 | Thyssen et al. |
| 6,263,307 B1 | 7/2001 | Arslan et al. |
| 6,281,749 B1 | 8/2001 | Klayman et al. |
| 6,327,370 B1 | 12/2001 | Killion et al. |
| 6,377,637 B1 | 4/2002 | Berdugo |
| 6,381,284 B1 | 4/2002 | Strizhevskiy |
| 6,381,469 B1 | 4/2002 | Wojick |
| 6,389,142 B1 | 5/2002 | Hagen et al. |
| 6,421,388 B1 | 7/2002 | Parizhsky et al. |
| 6,477,489 B1 | 11/2002 | Lockwood et al. |
| 6,480,610 B1 | 11/2002 | Fang et al. |
| 6,490,556 B1 | 12/2002 | Graumann et al. |
| 6,496,795 B1 | 12/2002 | Malvar |
| 6,504,926 B1 | 1/2003 | Edelson et al. |
| 6,584,438 B1 | 6/2003 | Manjunath et al. |
| 6,615,169 B1 | 9/2003 | Ojala et al. |
| 6,717,991 B1 | 4/2004 | Gustafsson et al. |
| 6,748,095 B1 | 6/2004 | Goss |
| 6,768,979 B1 | 7/2004 | Menendez-Pidal et al. |
| 6,772,117 B1 | 8/2004 | Laurila et al. |
| 6,810,273 B1 | 10/2004 | Mattila et al. |
| 6,862,567 B1 | 3/2005 | Gao |
| 6,873,837 B1 | 3/2005 | Yoshioka et al. |
| 6,882,736 B2 | 4/2005 | Dickel et al. |
| 6,907,045 B1 | 6/2005 | Robinson et al. |
| 6,931,123 B1 | 8/2005 | Hughes |
| 6,980,528 B1 | 12/2005 | LeBlanc et al. |
| 7,010,134 B2 | 3/2006 | Jensen |
| RE39,080 E | 4/2006 | Johnston |
| 7,035,666 B2 | 4/2006 | Silberfenig et al. |
| 7,054,809 B1 | 5/2006 | Gao |
| 7,058,572 B1 | 6/2006 | Nemer |
| 7,058,574 B2 | 6/2006 | Taniguchi et al. |
| 7,103,176 B2 | 9/2006 | Rodriguez et al. |
| 7,145,710 B2 | 12/2006 | Holmes |
| 7,190,775 B2 | 3/2007 | Rambo |
| 7,221,622 B2 | 5/2007 | Matsuo et al. |
| 7,245,710 B1 | 7/2007 | Hughes |
| 7,254,242 B2 | 8/2007 | Ise et al. |
| 7,283,956 B2 | 10/2007 | Ashley et al. |
| 7,366,658 B2 | 4/2008 | Moogi et al. |
| 7,383,179 B2 | 6/2008 | Alves et al. |
| 7,433,907 B2 | 10/2008 | Nagai et al. |
| 7,447,631 B2 | 11/2008 | Truman et al. |
| 7,472,059 B2 | 12/2008 | Huang |
| 7,548,791 B1 | 6/2009 | Johnston |
| 7,555,434 B2 | 6/2009 | Nomura et al. |
| 7,562,140 B2 | 7/2009 | Clemm et al. |
| 7,590,250 B2 | 9/2009 | Ellis et al. |
| 7,617,099 B2 | 11/2009 | Yang et al. |
| 7,617,282 B2 | 11/2009 | Han |
| 7,657,427 B2 | 2/2010 | Jelinek |
| 7,664,495 B1 | 2/2010 | Bonner et al. |
| 7,685,132 B2 | 3/2010 | Hyman |
| 7,773,741 B1 | 8/2010 | LeBlanc et al. |
| 7,791,508 B2 | 9/2010 | Wegener |
| 7,796,978 B2 | 9/2010 | Jones et al. |
| 7,899,565 B1 | 3/2011 | Johnston |
| 7,970,123 B2 | 6/2011 | Beaucoup |
| 8,032,369 B2 | 10/2011 | Manjunath et al. |
| 8,036,767 B2 | 10/2011 | Soulodre |
| 8,046,219 B2 | 10/2011 | Zurek et al. |
| 8,060,363 B2 | 11/2011 | Ramo et al. |
| 8,098,844 B2 | 1/2012 | Elko |
| 8,150,065 B2 | 4/2012 | Solbach et al. |
| 8,175,291 B2 | 5/2012 | Chan et al. |
| 8,189,429 B2 | 5/2012 | Chen et al. |
| 8,194,880 B2 | 6/2012 | Avendano |
| 8,194,882 B2 | 6/2012 | Every et al. |
| 8,195,454 B2 | 6/2012 | Muesch |
| 8,204,253 B1 | 6/2012 | Solbach |
| 8,229,137 B2 | 7/2012 | Romesburg |
| 8,233,352 B2 | 7/2012 | Beaucoup |
| 8,311,817 B2 | 11/2012 | Murgia et al. |
| 8,345,890 B2 | 1/2013 | Avendano et al. |
| 8,363,823 B1 | 1/2013 | Santos |
| 8,363,850 B2 * | 1/2013 | Amada ............... G10L 19/008 381/92 |
| 8,369,973 B2 | 2/2013 | Risbo |
| 8,467,891 B2 | 6/2013 | Huang et al. |
| 8,473,287 B2 | 6/2013 | Every et al. |
| 8,531,286 B2 | 9/2013 | Friar et al. |
| 8,606,249 B1 | 12/2013 | Goodwin |
| 8,615,392 B1 | 12/2013 | Goodwin |
| 8,615,394 B1 | 12/2013 | Avendano et al. |
| 8,639,516 B2 | 1/2014 | Lindahl et al. |
| 8,694,310 B2 | 4/2014 | Taylor |
| 8,705,759 B2 | 4/2014 | Wolff et al. |
| 8,744,844 B2 | 6/2014 | Klein |
| 8,750,526 B1 | 6/2014 | Santos et al. |
| 8,774,423 B1 | 7/2014 | Solbach |
| 8,798,290 B1 | 8/2014 | Choi et al. |
| 8,831,937 B2 | 9/2014 | Murgia et al. |
| 8,880,396 B1 | 11/2014 | Laroche et al. |
| 8,903,721 B1 | 12/2014 | Cowan |
| 8,908,882 B2 | 12/2014 | Goodwin et al. |
| 8,934,641 B2 | 1/2015 | Avendano et al. |
| 8,989,401 B2 | 3/2015 | Ojanpera |
| 9,007,416 B1 | 4/2015 | Murgia et al. |
| 9,094,496 B2 | 7/2015 | Teutsch |
| 9,185,487 B2 | 11/2015 | Solbach et al. |
| 9,197,974 B1 | 11/2015 | Clark et al. |
| 9,210,503 B2 | 12/2015 | Avendano et al. |
| 9,247,192 B2 | 1/2016 | Lee et al. |
| 2001/0041976 A1 | 11/2001 | Taniguchi et al. |

(56) References Cited

U.S. PATENT DOCUMENTS

| | | |
|---|---|---|
| 2002/0041678 A1 | 4/2002 | Basburg-Ertem et al. |
| 2002/0071342 A1 | 6/2002 | Marple et al. |
| 2002/0097884 A1 | 7/2002 | Cairns |
| 2002/0097885 A1* | 7/2002 | Birchfield .............. H04R 1/406 381/92 |
| 2002/0138263 A1 | 9/2002 | Deligne et al. |
| 2002/0160751 A1 | 10/2002 | Sun et al. |
| 2002/0177995 A1 | 11/2002 | Walker |
| 2003/0023430 A1 | 1/2003 | Wang et al. |
| 2003/0056220 A1 | 3/2003 | Thornton et al. |
| 2003/0093279 A1 | 5/2003 | Malah et al. |
| 2003/0099370 A1 | 5/2003 | Moore |
| 2003/0118200 A1 | 6/2003 | Beaucoup et al. |
| 2003/0138116 A1* | 7/2003 | Jones .................... H04R 3/005 381/94.1 |
| 2003/0147538 A1 | 8/2003 | Elko |
| 2003/0177006 A1 | 9/2003 | Ichikawa et al. |
| 2003/0179888 A1 | 9/2003 | Burnett et al. |
| 2003/0228019 A1 | 12/2003 | Eichler et al. |
| 2004/0001450 A1 | 1/2004 | He et al. |
| 2004/0066940 A1 | 4/2004 | Amir |
| 2004/0076190 A1 | 4/2004 | Goel et al. |
| 2004/0083110 A1 | 4/2004 | Wang |
| 2004/0102967 A1 | 5/2004 | Furuta et al. |
| 2004/0133421 A1 | 7/2004 | Burnett et al. |
| 2004/0145871 A1 | 7/2004 | Lee |
| 2004/0165736 A1 | 8/2004 | Hetherington et al. |
| 2004/0184882 A1 | 9/2004 | Cosgrove |
| 2005/0008169 A1 | 1/2005 | Muren et al. |
| 2005/0008179 A1 | 1/2005 | Quinn |
| 2005/0043959 A1 | 2/2005 | Stemerdink et al. |
| 2005/0080616 A1 | 4/2005 | Leung et al. |
| 2005/0096904 A1 | 5/2005 | Taniguchi et al. |
| 2005/0114123 A1 | 5/2005 | Lukac et al. |
| 2005/0143989 A1 | 6/2005 | Jelinek |
| 2005/0213739 A1 | 9/2005 | Rodman et al. |
| 2005/0240399 A1 | 10/2005 | Makinen |
| 2005/0249292 A1 | 11/2005 | Zhu |
| 2005/0261896 A1 | 11/2005 | Schuijers et al. |
| 2005/0267369 A1 | 12/2005 | Lazenby et al. |
| 2005/0276363 A1 | 12/2005 | Joublin et al. |
| 2005/0281410 A1 | 12/2005 | Grosvenor et al. |
| 2005/0283544 A1 | 12/2005 | Yee |
| 2006/0063560 A1 | 3/2006 | Herle |
| 2006/0092918 A1 | 5/2006 | Talalai |
| 2006/0100868 A1 | 5/2006 | Hetherington et al. |
| 2006/0122832 A1 | 6/2006 | Takiguchi et al. |
| 2006/0136203 A1 | 6/2006 | Ichikawa |
| 2006/0198542 A1 | 9/2006 | Benjelloun Touimi et al. |
| 2006/0206320 A1 | 9/2006 | Li |
| 2006/0224382 A1 | 10/2006 | Taneda |
| 2006/0242071 A1 | 10/2006 | Stebbings |
| 2006/0270468 A1 | 11/2006 | Hui et al. |
| 2006/0282263 A1 | 12/2006 | Vos et al. |
| 2006/0293882 A1 | 12/2006 | Giesbrecht et al. |
| 2007/0003097 A1 | 1/2007 | Langberg et al. |
| 2007/0005351 A1 | 1/2007 | Sathyendra et al. |
| 2007/0025562 A1 | 2/2007 | Zalewski et al. |
| 2007/0033020 A1 | 2/2007 | (Kelleher) Francois et al. |
| 2007/0033494 A1 | 2/2007 | Wenger et al. |
| 2007/0038440 A1 | 2/2007 | Sung et al. |
| 2007/0041589 A1 | 2/2007 | Patel et al. |
| 2007/0058822 A1 | 3/2007 | Ozawa |
| 2007/0064817 A1 | 3/2007 | Dunne et al. |
| 2007/0067166 A1 | 3/2007 | Pan et al. |
| 2007/0081075 A1 | 4/2007 | Canova, Jr. et al. |
| 2007/0088544 A1 | 4/2007 | Acero et al. |
| 2007/0100612 A1 | 5/2007 | Ekstrand et al. |
| 2007/0127668 A1 | 6/2007 | Ahya et al. |
| 2007/0136056 A1 | 6/2007 | Moogi et al. |
| 2007/0136059 A1 | 6/2007 | Gadbois |
| 2007/0150268 A1 | 6/2007 | Acero et al. |
| 2007/0154031 A1 | 7/2007 | Avendano et al. |
| 2007/0185587 A1 | 8/2007 | Kondo |
| 2007/0198254 A1 | 8/2007 | Goto et al. |
| 2007/0237271 A1 | 10/2007 | Pessoa et al. |
| 2007/0244695 A1 | 10/2007 | Manjunath et al. |
| 2007/0253574 A1 | 11/2007 | Soulodre |
| 2007/0276656 A1 | 11/2007 | Solbach et al. |
| 2007/0282604 A1 | 12/2007 | Gartner et al. |
| 2007/0287490 A1 | 12/2007 | Green et al. |
| 2008/0019548 A1 | 1/2008 | Avendano |
| 2008/0069366 A1 | 3/2008 | Soulodre |
| 2008/0111734 A1 | 5/2008 | Fam et al. |
| 2008/0117901 A1 | 5/2008 | Klammer |
| 2008/0118082 A1 | 5/2008 | Seltzer et al. |
| 2008/0140396 A1 | 6/2008 | Grosse-Schulte et al. |
| 2008/0159507 A1 | 7/2008 | Virolainen et al. |
| 2008/0160977 A1 | 7/2008 | Ahmaniemi et al. |
| 2008/0187143 A1 | 8/2008 | Mak-Fan |
| 2008/0192955 A1 | 8/2008 | Merks |
| 2008/0192956 A1 | 8/2008 | Kazama |
| 2008/0195384 A1 | 8/2008 | Jabri et al. |
| 2008/0208575 A1 | 8/2008 | Laaksonen et al. |
| 2008/0212795 A1 | 9/2008 | Goodwin et al. |
| 2008/0233934 A1 | 9/2008 | Diethorn |
| 2008/0247567 A1 | 10/2008 | Kjolerbakken et al. |
| 2008/0259731 A1 | 10/2008 | Happonen |
| 2008/0298571 A1 | 12/2008 | Kurtz et al. |
| 2008/0304677 A1 | 12/2008 | Abolfathi et al. |
| 2008/0310646 A1 | 12/2008 | Amada |
| 2008/0317259 A1 | 12/2008 | Zhang et al. |
| 2008/0317261 A1 | 12/2008 | Yoshida et al. |
| 2009/0012783 A1 | 1/2009 | Klein |
| 2009/0012784 A1 | 1/2009 | Murgia et al. |
| 2009/0018828 A1 | 1/2009 | Nakadai et al. |
| 2009/0034755 A1 | 2/2009 | Short et al. |
| 2009/0048824 A1 | 2/2009 | Amada |
| 2009/0060222 A1 | 3/2009 | Jeong et al. |
| 2009/0063143 A1 | 3/2009 | Schmidt et al. |
| 2009/0070118 A1 | 3/2009 | Den Brinker et al. |
| 2009/0086986 A1 | 4/2009 | Schmidt et al. |
| 2009/0089054 A1 | 4/2009 | Wang et al. |
| 2009/0106021 A1 | 4/2009 | Zurek et al. |
| 2009/0112579 A1 | 4/2009 | Li et al. |
| 2009/0116656 A1 | 5/2009 | Lee et al. |
| 2009/0119096 A1 | 5/2009 | Gerl et al. |
| 2009/0119099 A1 | 5/2009 | Lee et al. |
| 2009/0134829 A1 | 5/2009 | Baumann et al. |
| 2009/0141908 A1 | 6/2009 | Jeong et al. |
| 2009/0144053 A1 | 6/2009 | Tamura et al. |
| 2009/0144058 A1 | 6/2009 | Sorin |
| 2009/0147942 A1 | 6/2009 | Culter |
| 2009/0150149 A1 | 6/2009 | Culter et al. |
| 2009/0164905 A1 | 6/2009 | Ko |
| 2009/0192790 A1 | 7/2009 | El-Maleh et al. |
| 2009/0192791 A1 | 7/2009 | El-Maleh et al. |
| 2009/0204413 A1 | 8/2009 | Sintes et al. |
| 2009/0216526 A1 | 8/2009 | Schmidt et al. |
| 2009/0226005 A1 | 9/2009 | Acero et al. |
| 2009/0226010 A1 | 9/2009 | Schnell et al. |
| 2009/0228272 A1 | 9/2009 | Herbig et al. |
| 2009/0240497 A1 | 9/2009 | Usher et al. |
| 2009/0257609 A1 | 10/2009 | Gerkmann et al. |
| 2009/0262969 A1 | 10/2009 | Short et al. |
| 2009/0264114 A1 | 10/2009 | Virolainen et al. |
| 2009/0287481 A1 | 11/2009 | Paranjpe et al. |
| 2009/0292536 A1 | 11/2009 | Hetherington et al. |
| 2009/0303350 A1 | 12/2009 | Terada |
| 2009/0323655 A1 | 12/2009 | Cardona et al. |
| 2009/0323925 A1 | 12/2009 | Sweeney et al. |
| 2009/0323981 A1 | 12/2009 | Cutler |
| 2009/0323982 A1 | 12/2009 | Solbach et al. |
| 2010/0004929 A1 | 1/2010 | Baik |
| 2010/0017205 A1 | 1/2010 | Visser et al. |
| 2010/0033427 A1 | 2/2010 | Marks et al. |
| 2010/0036659 A1 | 2/2010 | Haulick et al. |
| 2010/0092007 A1 | 4/2010 | Sun |
| 2010/0094643 A1 | 4/2010 | Avendano et al. |
| 2010/0105447 A1 | 4/2010 | Sibbald et al. |
| 2010/0128123 A1 | 5/2010 | DiPoala |
| 2010/0130198 A1 | 5/2010 | Kannappan et al. |
| 2010/0211385 A1 | 8/2010 | Sehlstedt |
| 2010/0215184 A1 | 8/2010 | Buck et al. |

(56) References Cited

U.S. PATENT DOCUMENTS

| | | |
|---|---|---|
| 2010/0217837 A1 | 8/2010 | Ansari et al. |
| 2010/0228545 A1 | 9/2010 | Ito et al. |
| 2010/0245624 A1 | 9/2010 | Beaucoup |
| 2010/0278352 A1 | 11/2010 | Petit et al. |
| 2010/0280824 A1 | 11/2010 | Petit et al. |
| 2010/0296668 A1 | 11/2010 | Lee et al. |
| 2010/0303298 A1 | 12/2010 | Marks et al. |
| 2010/0315482 A1 | 12/2010 | Rosenfeld et al. |
| 2011/0038486 A1 | 2/2011 | Beaucoup |
| 2011/0038489 A1* | 2/2011 | Visser .................. G01S 3/8006 381/92 |
| 2011/0038557 A1 | 2/2011 | Closset et al. |
| 2011/0044324 A1 | 2/2011 | Li et al. |
| 2011/0075857 A1 | 3/2011 | Aoyagi |
| 2011/0081024 A1 | 4/2011 | Soulodre |
| 2011/0081026 A1 | 4/2011 | Ramakrishnan et al. |
| 2011/0107367 A1 | 5/2011 | Georgis et al. |
| 2011/0129095 A1 | 6/2011 | Avendano et al. |
| 2011/0137646 A1 | 6/2011 | Ahgren et al. |
| 2011/0142257 A1 | 6/2011 | Goodwin et al. |
| 2011/0173006 A1 | 7/2011 | Nagel et al. |
| 2011/0173542 A1 | 7/2011 | Imes et al. |
| 2011/0182436 A1 | 7/2011 | Murgia et al. |
| 2011/0184732 A1 | 7/2011 | Godavarti |
| 2011/0184734 A1 | 7/2011 | Wang et al. |
| 2011/0191101 A1 | 8/2011 | Uhle et al. |
| 2011/0208520 A1 | 8/2011 | Lee |
| 2011/0224994 A1 | 9/2011 | Norvell et al. |
| 2011/0257965 A1 | 10/2011 | Hardwick |
| 2011/0257967 A1 | 10/2011 | Every et al. |
| 2011/0264449 A1 | 10/2011 | Sehlstedt |
| 2011/0280154 A1 | 11/2011 | Silverstrim et al. |
| 2011/0286605 A1 | 11/2011 | Furuta et al. |
| 2011/0300806 A1 | 12/2011 | Lindahl et al. |
| 2011/0305345 A1 | 12/2011 | Bouchard et al. |
| 2012/0027217 A1 | 2/2012 | Jun et al. |
| 2012/0050582 A1 | 3/2012 | Seshadri et al. |
| 2012/0062729 A1 | 3/2012 | Hart et al. |
| 2012/0116758 A1 | 5/2012 | Murgia et al. |
| 2012/0116769 A1 | 5/2012 | Malah et al. |
| 2012/0123775 A1 | 5/2012 | Murgia et al. |
| 2012/0133728 A1 | 5/2012 | Lee |
| 2012/0182429 A1 | 7/2012 | Forutanpour et al. |
| 2012/0202485 A1 | 8/2012 | Mirbaha et al. |
| 2012/0209611 A1 | 8/2012 | Furuta et al. |
| 2012/0231778 A1 | 9/2012 | Chen et al. |
| 2012/0249785 A1 | 10/2012 | Sudo et al. |
| 2012/0250882 A1 | 10/2012 | Mohammad et al. |
| 2012/0257778 A1 | 10/2012 | Hall et al. |
| 2013/0034243 A1 | 2/2013 | Yermeche et al. |
| 2013/0051543 A1 | 2/2013 | McDysan et al. |
| 2013/0182857 A1 | 7/2013 | Namba et al. |
| 2013/0289988 A1 | 10/2013 | Fry |
| 2013/0289996 A1 | 10/2013 | Fry |
| 2013/0322461 A1 | 12/2013 | Poulsen |
| 2013/0332156 A1 | 12/2013 | Tackin et al. |
| 2013/0332171 A1 | 12/2013 | Avendano et al. |
| 2013/0343549 A1 | 12/2013 | Vemireddy et al. |
| 2014/0003622 A1 | 1/2014 | Ikizyan et al. |
| 2014/0126745 A1* | 5/2014 | Dickins .................. H04R 3/002 381/94.3 |
| 2014/0350926 A1 | 11/2014 | Schuster et al. |
| 2015/0025881 A1 | 1/2015 | Carlos et al. |
| 2015/0078555 A1 | 3/2015 | Zhang et al. |
| 2015/0078606 A1 | 3/2015 | Zhang et al. |
| 2015/0208165 A1 | 7/2015 | Volk et al. |
| 2015/0304766 A1* | 10/2015 | Delikaris-Manias ............................ G10L 21/0216 381/92 |
| 2016/0037245 A1 | 2/2016 | Harrington |
| 2016/0061934 A1 | 3/2016 | Woodruff et al. |
| 2016/0078880 A1 | 3/2016 | Avendano et al. |
| 2016/0093307 A1 | 3/2016 | Warren et al. |

FOREIGN PATENT DOCUMENTS

| | | |
|---|---|---|
| EP | 1081685 A2 | 3/2001 |
| EP | 1536660 A2 | 6/2005 |
| FI | 20080623 A | 11/2008 |
| FI | 20110428 A | 12/2011 |
| FI | 20125600 A | 6/2012 |
| FI | 123080 B | 10/2012 |
| JP | 05172865 A | 7/1993 |
| JP | H05300419 A | 11/1993 |
| JP | H07336793 A | 12/1995 |
| JP | 2004053895 A | 2/2004 |
| JP | 2004531767 A | 10/2004 |
| JP | 2004533155 A | 10/2004 |
| JP | 2005148274 A | 6/2005 |
| JP | 2005518118 A | 6/2005 |
| JP | 2005309096 A | 11/2005 |
| JP | 2006515490 A | 5/2006 |
| JP | 2007201818 A | 8/2007 |
| JP | 2008518257 A | 5/2008 |
| JP | 2008542798 A | 11/2008 |
| JP | 2009037042 A | 2/2009 |
| JP | 2009538450 A | 11/2009 |
| JP | 2012514233 A | 6/2012 |
| JP | 5081903 B2 | 9/2012 |
| JP | 2013513306 A | 4/2013 |
| JP | 2013527479 A | 6/2013 |
| JP | 5718251 B2 | 3/2015 |
| JP | 5855571 B2 | 12/2015 |
| KR | 1020070068270 | 6/2007 |
| KR | 101050379 B1 | 12/2008 |
| KR | 1020080109048 | 12/2008 |
| KR | 1020090013221 | 2/2009 |
| KR | 1020110111409 | 10/2011 |
| KR | 1020120094892 | 8/2012 |
| KR | 1020120101457 | 9/2012 |
| KR | 101294634 B1 | 8/2013 |
| KR | 101610662 B1 | 4/2016 |
| TW | 519615 B | 2/2003 |
| TW | 200847133 A | 12/2008 |
| TW | 201113873 A | 4/2011 |
| TW | 201143475 A | 12/2011 |
| TW | I421858 B | 1/2014 |
| TW | 201513099 A | 4/2015 |
| WO | WO8400634 | 2/1984 |
| WO | WO0207061 | 1/2002 |
| WO | WO02080362 | 10/2002 |
| WO | WO02103676 | 12/2002 |
| WO | WO03069499 | 8/2003 |
| WO | WO2004010415 A1 | 1/2004 |
| WO | WO2005086138 A1 | 9/2005 |
| WO | WO2007140003 A2 | 12/2007 |
| WO | WO2008034221 A1 | 3/2008 |
| WO | WO2010077361 A1 | 7/2010 |
| WO | WO2011002489 A1 | 1/2011 |
| WO | WO2011068901 A1 | 6/2011 |
| WO | WO2012094422 A2 | 7/2012 |
| WO | WO2013188562 A2 | 12/2013 |
| WO | WO2015010129 A1 | 1/2015 |
| WO | WO2016040885 A1 | 3/2016 |
| WO | WO2016049566 A1 | 3/2016 |

OTHER PUBLICATIONS

Non-Final Office Action, dated Dec. 28, 2015, U.S. Appl. No. 14/081,723, filed Nov. 15, 2013.
Final Office Action, dated Dec. 10, 2015, U.S. Appl. No. 13/916,388, filed Jun. 12, 2013.
Non-Final Office Action, dated Nov. 3, 2015, U.S. Appl. No. 12/962,519, filed Dec. 7, 2010.
Non-Final Office Action, dated Sep. 14, 2015, U.S. Appl. No. 14/094,347, Dec. 2, 2013.
Notice of Allowance, dated Jul. 30, 2015, U.S. Appl. No. 12/896,725, filed Oct. 1, 2010.
Notice of Allowance, dated Jul. 15, 2015, U.S. Appl. No. 13/735,446, filed Jan. 7, 2013.
Non-Final Office Action, dated May 20, 2015, U.S. Appl. No. 12/959,994, filed Dec. 3, 2010.

(56) References Cited

OTHER PUBLICATIONS

Non-Final Office Action, dated May 15, 2015, U.S. Appl. No. 12/963,493, filed Dec. 8, 2010.
Non-Final Office Action, dated Mar. 30, 2015, U.S. Appl. No. 12/958,710, filed Dec. 2, 2010.
Final Office Action, dated Mar. 18, 2015, U.S. Appl. No. 12/904,010, dated Oct. 13, 2010.
Non-Final Office Action, dated Mar. 3, 2015, U.S. Appl. No. 13/916,388, filed Jun. 12, 2013.
Final Office Action, dated Feb. 10, 2015, U.S. Appl. No. 12/962,519, filed Dec. 7, 2010.
Notice of Allowance, dated Dec. 3, 2014, U.S. Appl. No. 13/415,535, filed Mar. 8, 2012.
Non-Final Office Action, dated Nov. 19, 2014, U.S. Appl. No. 12/896,725, filed Oct. 1, 2010.
Non-Final Office Action, dated Sep. 29, 2014, U.S. Appl. No. 13/735,446, filed Jan. 7, 2013.
Final Office Action, dated Sep. 17, 2014, U.S. Appl. No. 13/415,535, filed Mar. 8, 2012.
Non-Final Office Action, dated Aug. 29, 2014, U.S. Appl. No. 12/904,010, filed Oct. 13, 2010.
Non-Final Office Action, dated Jul. 31, 2014, U.S. Appl. No. 12/963,493, filed Dec. 8, 2010.
Notice of Allowance, dated Jul. 23, 2014, U.S. Appl. No. 12/908,746, filed Oct. 20, 2010.
Non-Final Office Action, dated Jul. 21, 2014, U.S. Appl. No. 12/959,994, filed Dec. 3, 2010.
Non-Final Office Action, dated Jun. 6, 2014, U.S. Appl. No. 12/958,710, filed Dec. 2, 2010.
Non-Final Office Action, dated May 13, 2014, U.S. Appl. No. 12/962,519, filed Dec. 7, 2010.
Final Office Action, dated Apr. 9, 2014, U.S. Appl. No. 13/735,446, filed Jan. 7, 2013.
Notice of Allowance, dated Mar. 26, 2014, U.S. Appl. No. 12/841,098, filed Jul. 21, 2010.
Final Office Action, dated Mar. 13, 2014, U.S. Appl. No. 12/904,010, filed Oct. 13, 2010.
Non-Final Office Action, dated Mar. 4, 2014, U.S. Appl. No. 13/415,535, filed Mar. 8, 2012.
Notice of Allowance, dated Jan. 31, 2014, U.S. Appl. No. 13/734,208, filed Jan. 4, 2013.
Non-Final Office Action, dated Jan. 30, 2014, U.S. Appl. No. 12/896,725, filed Oct. 1, 2010.
Non-Final Office Action, dated Dec. 13, 2013, U.S. Appl. No. 13/735,446, filed Jan. 7, 2013.
Non-Final Office Action, dated Nov. 20, 2013, U.S. Appl. No. 12/908,746, filed Oct. 20, 2010.
Non-Final Office Action, dated Oct. 8, 2013, U.S. Appl. No. 13/734,208, filed Jan. 4, 2013.
Notice of Allowance, dated Sep. 17, 2013, U.S. Appl. No. 13/751,907, filed Jan. 28, 2013.
Non-Final Office Action, dated Aug. 23, 2013, U.S. Appl. No. 12/904,010, filed Oct. 13, 2010.
Notice of Allowance, dated Aug. 15, 2013, U.S. Appl. No. 12/893,208, filed Sep. 29, 2010.
Notice of Allowance, dated Jul. 29, 2013, U.S. Appl. No. 13/414,121, filed Mar. 7, 2012.
Non-Final Office Action, dated Jun. 26, 2013, U.S. Appl. No. 12/959,994, filed Dec. 3, 2010.
Final Office Action, dated Jun. 3, 2013, U.S. Appl. No. 12/841,098, filed Jul. 21, 2010.
Non-Final Office Action, dated May 28, 2013, U.S. Appl. No. 13/735,446, filed Jan. 7, 2013.
Final Office Action, dated May 22, 2013, U.S. Appl. No. 12/896,725, filed Oct. 1, 2010.
Non-Final Office Action, dated May 10, 2013, U.S. Appl. No. 13/751,907, filed Jan. 28, 2013.
Final Office Action, dated May 7, 2013, U.S. Appl. No. 12/963,493, filed Dec. 8, 2010.
Non-Final Office Action, dated Apr. 25, 2013, U.S. Appl. No. 12/904,010, filed Oct. 13, 2010.
Final Office Action, dated Apr. 24, 2013, U.S. Appl. No. 12/958,710, filed Dec. 2, 2010.
Final Office Action, dated Apr. 9, 2013, U.S. Appl. No. 12/908,746, filed Oct. 20, 2010.
Non-Final Office Action, dated Apr. 8, 2013, U.S. Appl. No. 12/893,208, filed Sep. 29, 2010.
Non-Final Office Action, dated Jan. 31, 2013, U.S. Appl. No. 13/414,121, filed Mar. 7, 2012.
Non-Final Office Action, dated Jan. 2, 2013, U.S. Appl. No. 12/963,493, filed Dec. 8, 2010.
Non-Final Office Action, dated Dec. 12, 2012, U.S. Appl. No. 12/908,746, filed Oct. 20, 2010.
Non-Final Office Action, dated Nov. 9, 2012, U.S. Appl. No. 12/841,098, filed Jul. 21, 2010.
Non-Final Office Action, dated Oct. 24, 2012, U.S. Appl. No. 12/958,710, filed Dec. 2, 2010.
Non-Final Office Action, dated Oct. 11, 2012, U.S. Appl. No. 12/896,725, filed Oct. 1, 2010.
Notice of Allowance, dated Sep. 27, 2012, U.S. Appl. No. 13/568,989, filed Aug. 7, 2012.
Non-Final Office Action, dated Feb. 4, 2016, U.S. Appl. No. 14/341,697, filed Jul. 25, 2014.
Office Action dated Jan. 30, 2015 in Finland Patent Application No. 20080623, filed May 24, 2007.
Office Action dated Mar. 27, 2015 in Korean Patent Application No. 10-2011-7016591, filed Dec. 30, 2009.
Notice of Allowance dated Aug. 13, 2015 in Finnish Patent Application 20080623, filed May 24, 2007.
Office Action dated Oct. 15, 2015 in Korean Patent Application 10-2011-7016591.
Notice of Allowance dated Jan. 14, 2016 in South Korean Patent Application No. 10-2011-7016591 filed Jul. 15, 2011.
International Search Report & Written Opinion dated Feb. 12, 2016 in Patent Cooperation Treaty Application No. PCT/US2015/064523, filed Dec. 8, 2015.
Klein, David, "Noise-Robust Multi-Lingual Keyword Spotting with a Deep Neural Network Based Architecture", U.S. Appl. No. 14/614,348, filed Feb. 4, 2015.
Vitus, Deborah Kathleen et al., "Method for Modeling User Possession of Mobile Device for User Authentication Framework", U.S. Appl. No. 14/548,207, filed Nov. 19, 2014.
Murgia, Carlo, "Selection of System Parameters Based on Non-Acoustic Sensor Information", U.S. Appl. No. 14/331,205, filed Jul. 14, 2014.
Goodwin, Michael M. et al., "Key Click Suppression", U.S. Appl. No. 14/745,176, filed Jun. 19, 2015.
International Search Report and Written Opinion dated Feb. 7, 2011 in Patent Cooperation Treaty Application No. PCT/US10/58600.
International Search Report dated Dec. 20, 2013 in Patent Cooperation Treaty Application No. PCT/US2013/045462, filed Jun. 12, 2013.
Office Action dated Aug. 26, 2014 in Japan Application No. 2012-542167, filed Dec. 1, 2010.
Office Action dated Oct. 31, 2014 in Finland Patent Application No. 20125600, filed Jun. 1, 2012.
Office Action dated Jul. 21, 2015 in Japan Patent Application No. 2012-542167, filed Dec. 1, 2010.
Office Action dated Sep. 29, 2015 in Finland Patent Application No. 20125600, filed Dec. 1, 2010.
Allowance dated Nov. 17, 2015 in Japan Patent Application No. 2012-542167, filed Dec. 1, 2010.
International Search Report & Written Opinion dated Dec. 14, 2015 in Patent Cooperation Treaty Application No. PCT/US2015/049816, filed Sep. 11, 2015.
International Search Report & Written Opinion dated Dec. 22, 2015 in Patent Cooperation Treaty Application No. PCT/US2015/052433, filed Sep. 25, 2015.
International Search Report & Written Opinion dated Feb. 11, 2016 in Patent Cooperation Treaty Application No. PCT/US2015/063519, filed Dec. 2, 2015.

(56) References Cited

OTHER PUBLICATIONS

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.
"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.
Fulghum, D. P. et al., "LPC Voice Digitizer with Background Noise Suppression", 1979 IEEE International Conference on Acoustics, Speech, and Signal Processing, pp. 220-223.
Haykin, Simon et al., "Appendix A.2 Complex Numbers." Signals and Systems. 2nd Ed. 2003. p. 764.
Hohmann, V. "Frequency Analysis and Synthesis Using a Gammatone Filterbank", ACTA Acustica United with Acustica, 2002, vol. 88, pp. 433-442.
Martin, Rainer "Spectral Subtraction Based on Minimum Statistics", in Proceedings Europe. Signal Processing Conf., 1994, pp. 1182-1185.
Mitra, Sanjit K. Digital Signal Processing: a Computer-based Approach. 2nd Ed. 2001. pp. 131-133.
Cosi, Piero et al., (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.
Rabiner, Lawrence R. et al., "Digital Processing of Speech Signals", (Prentice-Hall Series in Signal Processing). Upper Saddle River, NJ: Prentice Hall, 1978.
Schimmel, Steven et al., "Coherent Envelope Detection for Modulation Filtering of Speech," 2005 IEEE International Conference on Acoustics, Speech, and Signal Processing, vol. 1, No. 7, pp. 221-224.
Slaney, Malcom, et al., "Auditory Model Inversion for Sound Separation," 1994 IEEE International Conference on Acoustics, Speech and Signal Processing, Apr. 19-22, vol. 2, pp. 77-80.
Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.
Solbach, Ludger "An Architecture for Robust Partial Tracking and Onset Localization in Single Channel Audio Signal Mixes", Technical University Hamburg-Harburg, 1998.
International Search Report and Written Opinion dated Sep. 16, 2008 in Patent Cooperation Treaty Application No. PCT/US2007/012628.
International Search Report and Written Opinion dated May 20, 2010 in Patent Cooperation Treaty Application No. PCT/US2009/006754.
Fast Cochlea Transform, US Trademark Reg. No. 2,875,755 (Aug. 17, 2004).
3GPP2 "Enhanced Variable Rate Codec, Speech Service Options 3, 68, 70, and 73 for Wideband Spread Spectrum Digital Systems", May 2009, pp. 1-308.
3GPP2 "Selectable Mode Vocoder (SMV) Service Option for Wideband Spread Spectrum Communication Systems", Jan. 2004, pp. 1-231.
3GPP2 "Source-Controlled Variable-Rate Multimode Wideband Speech Codec (VMR-WB) Service Option 62 for Spread Spectrum Systems", Jun. 11, 2004, pp. 1-164.
3GPP "3GPP Specification 26.071 Mandatory Speech CODEC Speech Processing Functions; AMR Speech Codec; General Description", http://www.3gpp.org/ftp/Specs/html-info/26071.htm, accessed on Jan. 25, 2012.
3GPP "3GPP Specification 26.094 Mandatory Speech Codec Speech Processing Functions; Adaptive Multi-Rate (AMR) Speech Codec; Voice Activity Detector (VAD)", http://www.3gpp.org/ftp/Specs/html-info/26094.htm, accessed an Jan. 25, 2012.
3GPP "3GPP Specification 26.171 Speech Codec Speech Processing Functions; Adaptive Multi-Rate—Wideband (AMR-WB) Speech Codec; General Description", http://www.3gpp.org/ftp/Specs/html-info26171.htm, accessed on Jan. 25, 2012.
3GPP "3GPP Specification 26.194 Speech Codec Speech Processing Functions; Adaptive Multi-Rate—Wideband (AMR-WB) Speech Codec; Voice Activity Detector (VAD)" http://www.3gpp.org/ftp/Specs/html-info26194.htm, accessed on Jan. 25, 2012.
International Telecommunication Union "Coding of Speech at 8 kbit/s Using Conjugate-Structure Algebraic-code-excited Linear-prediction (CS-ACELP)", Mar. 19, 1996, pp. 1-39.
International Telecommunication Union "Coding of Speech at 8 kbit/s Using Conjugate Structure Algebraic-code-excited Linear-prediction (CS-ACELP) Annex B: A Silence Compression Scheme for G.729 Optimized for Terminals Conforming to Recommendation V.70", Nov. 8, 1996, pp. 1-23.
International Search Report and Written Opinion dated Aug. 19, 2010 in Patent Cooperation Treaty Application No. PCT/US2010/001786.
Cisco, "Understanding How Digital T1 CAS (Robbed Bit Signaling) Works in IOS Gateways", Jan. 17, 2007, http://www.cisco.com/image/gif/paws/22444/t1-cas-ios.pdf, accessed on Apr. 3, 2012.
Jelinek et al., "Noise Reduction Method for Wideband Speech Coding" Proc. Eusipco, Vienna, Austria, Sep. 2004, pp. 1959-1962.
Widjaja et al., "Application of Differential Microphone Array for IS-127 EVRC Rate Determination Algorithm", Interspeech 2009, 10th Annual Conference of the International Speech Communication Association, Brighton, United Kingdom Sep. 6-10, 2009, pp. 1123-1126.
Sugiyama et al., "Single-Microphone Noise Suppression for 3G Handsets Based on Weighted Noise Estimation" in Benesty et al., "Speech Enhancement", 2005, pp. 115-133, Springer Berlin Heidelberg.
Watts, "Real-Time, High-Resolution Simulation of the Auditory Pathway, with Application to Cell-Phone Noise Reduction" Proceedings of 2010 IEEE International Symposium on Circuits and Systems (ISCAS), May 30-Jun. 2, 2010, pp. 3821-3824.
3GPP Minimum Performance Specification for the Enhanced Variable rate Codec, Speech Service Option 3 and 68 for Wideband Spread Spectrum Digital Systems, Jul. 2007, pp. 1-83.
Ramakrishnan, 2000. Reconstruction of Incomplete Spectrograms for robust speech recognition. PHD thesis, Carnegie Mellon University, Pittsburgh, Pennsylvania.
Kim et al., "Missing-Feature Reconstruction by Leveraging Temporal Spectral Correlation for Robust Speech Recognition in Background Noise Conditions," Audio, Speech, and Language Processing, IEEE Transactions on, vol. 18, No. 8 pp. 2111-2120, Nov. 2010.
Cooke et al.,"Robust Automatic Speech Recognition with Missing and Unreliable Acoustic data," Speech Commun., vol. 34, No. 3, pp. 267-285, 2001.
Liu et al., "Efficient cepstral normalization for robust speech recognition." Proceedings of the workshop on Human Language Technology. Association for Computational Linguistics, 1993.
Yoshizawa et al., "Cepstral gain normalization for noise robust speech recognition." Acoustics, Speech, and Signal Processing, 2004. Proceedings, (ICASSP04), IEEE International Conference on vol. 1 IEEE, 2004.
Office Action dated Apr. 8, 2014 in Japan Patent Application 2011-544416, filed Dec. 30, 2009.
Elhilali et al.,"A cocktail party with a cortical twist: How cortical mechanisms contribute to sound segregation." J. Acoust. Soc. Am., vol. 124, No. 6, Dec. 2008; 124(6): 3751-3771).
Jin et al., "HMM-Based Multipitch Tracking for Noisy and Reverberant Speech." Jul. 2011.
Kawahara, W., et al., "Tandem-Straight: A temporally stable power spectral representation for periodic signals and applications to interference-free spectrum, F0, and aperiodicity estimation." IEEE ICASSP 2008.
Lu et al. "A Robust Audio Classification and Segmentation Method." Microsoft Research, 2001, pp. 203, 206, and 207.
International Search Report & Written Opinion dated Nov. 12, 2014 in Patent Cooperation Treaty Application No. PCT/US2014/047458, filed Jul. 21, 2014.

(56) References Cited

OTHER PUBLICATIONS

Krini, Mohamed et al., "Model-Based Speech Enhancement," in Speech and Audio Processing in Adverse Environments; Signals and Communication Technology, edited by Hansler et al., 2008, Chapter 4, pp. 89-134.
Office Action dated Dec. 9, 2014 in Japan Patent Application No. 2012-518521, filed Jun. 21, 2010.
Office Action dated Dec. 10, 2014 in Taiwan Patent Application No. 099121290, filed Jun. 29, 2010.
Purnhagen, Heiko, "Low Complexity Parametric Stereo Coding in MPEG-4," Proc. of the 7th Int. Conference on Digital Audio Effects (DAFx'04), Naples, Italy, Oct. 5-8, 2004.
Chang, Chun-Ming et al., "Voltage-Mode Multifunction Filter with Single Input and Three Outputs Using Two Compound Current Conveyors" IEEE Transactions on Circuits and Systems-I: Fundamental Theory and Applications, vol. 46, No. 11, Nov. 1999.
Nayebi et al., "Low delay FIR filter banks: design and evaluation" IEEE Transactions on Signal Processing, vol. 42, No. 1, pp. 24-31, Jan. 1994.
Notice of Allowance dated Feb. 17, 2015 in Japan Patent Application No. 2011-5444116, filed Dec. 30, 2009.

\* cited by examiner

DIRECTIONAL AUDIO CAPTURE

CROSS-REFERENCE TO RELATED APPLICATIONS

The present application is a Continuation-in-Part of U.S. patent application Ser. No. 12/896,725, filed Oct. 1, 2010, which claims the benefit of U.S. Provisional Application No. 61/266,131, filed Dec. 2, 2009; the present application also claims the benefit of U.S. Provisional Application No. 62/098,247, filed Dec. 30, 2014. The subject matter of the aforementioned applications is incorporated herein by reference for all purposes.

FIELD

The present disclosure relates generally to audio processing and, more particularly, to systems and methods for improving performance of directional audio capture.

BACKGROUND

Existing systems for directional audio capture are typically configured to capture an audio signal within an area of interest (e.g., within a lobe) and to suppress anything outside the lobe. Furthermore, the existing systems for directional audio capture do not utilize the directionality of the speaker being recorded. This results in non-uniform suppression throughout the lobe. The robustness of such systems can be compromised, especially in cases of varying distances between a talker (i.e., speaker) and an audio capturing device for a given angle. If the talker moves closer to or farther away from the device, the suppression can become non-uniform.

In the existing solutions for directional audio capture, off-the box/calibration and customer requirements may disagree. This disagreement may result in more or less suppression needed at a certain range of angles. With the non-uniform suppression, deploying such solutions can become even more challenging where suppressing/boosting certain angles is desirable to maintain uniform noise suppression across the lobe.

The existing directional audio capture solutions can also be very sensitive to microphone sealing. Better microphone sealing results in more uniform suppression and poor microphone sealing results in non-uniform suppression. Microphone sealing, in general, can make one device different from another device even when the same batch of manufacturing is used. A solution that makes microphone sealing robust during a change in distance between a talker and an audio capture system is desirable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for improving performance of a directional audio capturing system. An example method includes correlating phase plots of at least two audio inputs. The method allows for generating, based on the correlation, estimates of salience at different directional angles to localize at least one direction associated with at least one source of a sound. The method also includes determining cues, based on the estimates of salience, and providing the cues to the directional audio capture system.

In some embodiments, the cues are used by the directional audio capture system to attenuate or amplify the at least two audio inputs at the different directional angles. In certain embodiments, the cues include at least attenuation levels for the different directional angles. In some embodiments, the estimates of salience include a vector of saliences at directional angles from 0 to 360 in a plane parallel to a ground.

In some embodiments, generating the cues includes mapping the different directional angles to relative levels of attenuation for the directional audio capture system. In certain embodiments, the method includes controlling the rate of changing of the levels of attenuation in a real time by attack and release time constants to avoid sound artifacts.

In some embodiments, the method includes determining, based on absence or presence of one or more peaks in the estimates of salience, a mode from a plurality of the operational modes. The method allows configuring, based on the determined mode, the directional audio capture system. In certain embodiments, the method allows controlling a rate of switching between modes from the plurality of the operational modes in real time by applying attack and release time constants. In some embodiments, the audio inputs are captured by at least two microphones having different qualities of sealing.

According to another example embodiment of the present disclosure, the steps of the method for improving performance of directional audio capture systems are stored on a machine-readable medium comprising instructions, which when implemented by one or more processors, perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The technology disclosed herein relates to systems and methods for improving performance of directional audio capture. Embodiments of the present technology may be practiced with audio devices operable at least to capture and process acoustic signals. The audio devices can include: radio frequency (RF) receivers, transmitters, and transceivers; wired and/or wireless telecommunications and/or networking devices; amplifiers; audio and/or video players; encoders; decoders; speakers; inputs; outputs; storage devices; and user input devices. Audio devices may include input devices such as buttons, switches, keys, keyboards, trackballs, sliders, touch screens, one or more microphones, gyroscopes, accelerometers, global positioning system (GPS) receivers, and the like. The audio devices may include outputs, such as Light-Emitting Diode (LED) indicators, video displays, touchscreens, speakers, and the like. In some embodiments, the audio devices include hand-held devices, such as wired and/or wireless remote controls, notebook computers, tablet computers, phablets, smart phones, personal digital assistants, media players, mobile telephones, and the like. In certain embodiments, the audio devices include Television (TV) sets, car control and audio systems, smart thermostats, light switches, dimmers, and so on.

In various embodiments, the audio devices operate in stationary and portable environments. Stationary environments can include residential and commercial buildings or structures, and the like. For example, the stationary embodiments can include living rooms, bedrooms, home theaters, conference rooms, auditoriums, business premises, and the like. Portable environments can include moving vehicles, moving persons, other transportation means, and the like.

According to an example embodiment, a method for improving a directional audio capture system includes correlating phase plots of at least two audio inputs. The method allows for generating, based on the correlation, estimates of salience at different directional angles to localize at least one direction associated with at least one source of a sound. The cues include at least levels of attenuation. The method includes determining cues, based on the estimates of salience, and providing the cues to the directional audio capture system.

Figure 1:
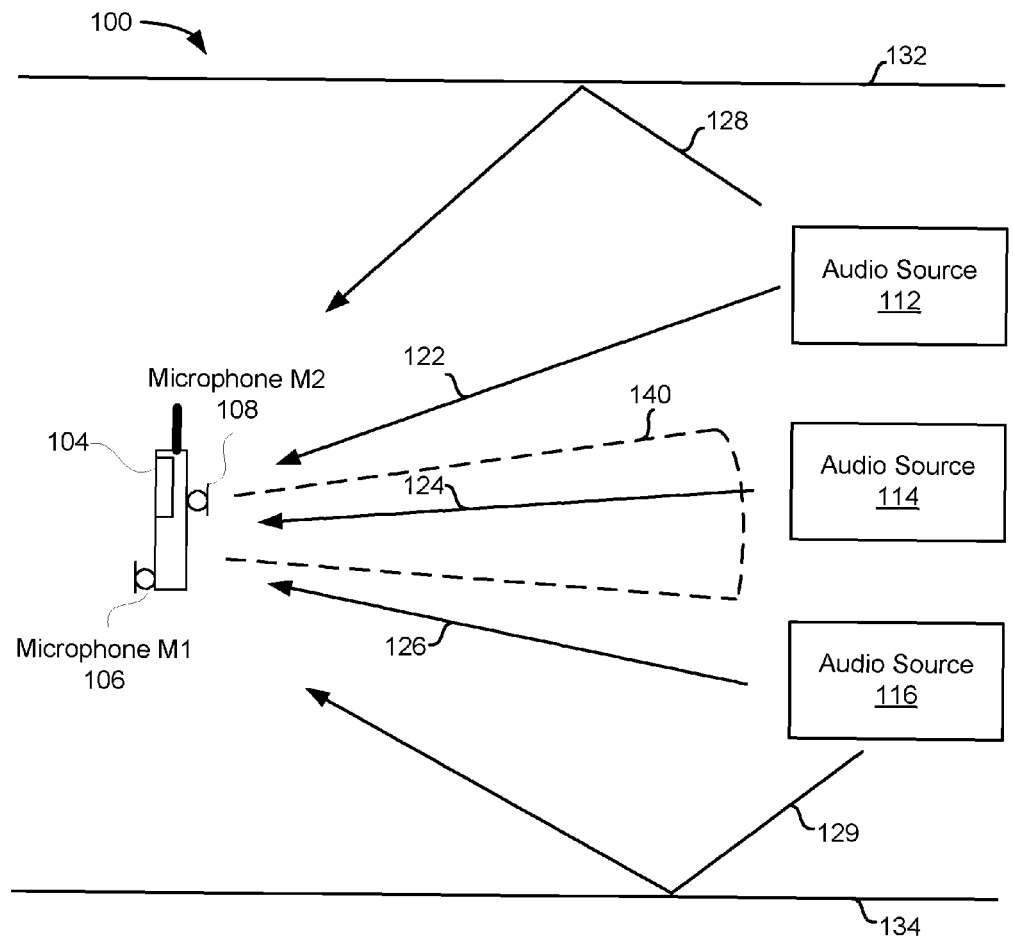
FIG. 1 is a block diagram of an exemplary environment in which the present technology can be used.

FIG. 1 is a block diagram of an exemplary environment 100 in which the present technology can be used. The environment 100 of FIG. 1 includes audio device 104, and audio sources 112, 114 and 116, all within an environment 100 having walls 132 and 134.

A user of the audio device 104 may choose to focus on or "zoom" into a particular audio source from the multiple audio sources within environment 100. Environment 100 includes audio sources 112, 114, and 116 which all provide audio in multidirections, including towards audio device 104. Additionally, reflections from audio sources 112 and 116 as well as other audio sources may provide audio which reflects off the walls 132 and 134 of the environment 100 and is directed at audio device 104. For example, reflection 128 is a reflection of an audio signal provided by audio source 112 and reflected from wall 132, and reflection 129 is a reflection of an audio signal provided by audio source 116 and reflected from wall 134, both of which travel towards audio device 104.

The present technology allows the user to select an area to "zoom." By performing an audio zoom on a particular area, the present technology detects audio signals having a source within the particular area and enhances those signals with respect to signals from audio sources outside the particular area. The area may be defined using a beam, such as, for example, beam 140 in FIG. 1. In FIG. 1, beam 140 contains an area that includes audio source 114. Audio sources 112 and 116 are contained outside the beam area. As such, the present technology would emphasize or "zoom" into the audio signal provided by audio source 114 and de-emphasize the audio provided by audio sources 112 and 116, including any reflections provided by environment 100, such as reflections 128 and 129.

A primary microphone 106 and secondary microphone 108 of audio device 104 may be omni-directional microphones. Alternate embodiments may utilize other forms of microphones or acoustic sensors, such as directional microphones.

While the microphones 106 and 108 receive sound (i.e., acoustic signals) from the audio source 114, the microphones 106 and 108 also pick up noise from audio source 112. Although the noise 122 is shown coming from a single location in FIG. 1, the noise 122 may include any sounds from one or more locations that differ from the location of audio source 114, and may include reverberations and echoes. The noise 124 may be stationary, non-stationary, and/or a combination of both stationary and non-stationary noise.

Some embodiments may utilize level differences (e.g., energy differences) between the acoustic signals received by the two microphones 106 and 108. Because the primary microphone 106 is much closer to the audio source 116 than the secondary microphone 108 in a close-talk use case, the intensity level for noise 126 is higher for the primary microphone 106, resulting in a larger energy level received by the primary microphone 106 during a speech/voice segment, for example.

The level difference may then be used to discriminate speech and noise in the time-frequency domain. Further embodiments may use a combination of energy level differences and time delays to discriminate speech. Based on binaural cue encoding, speech signal extraction or speech enhancement may be performed.

Figure 2:
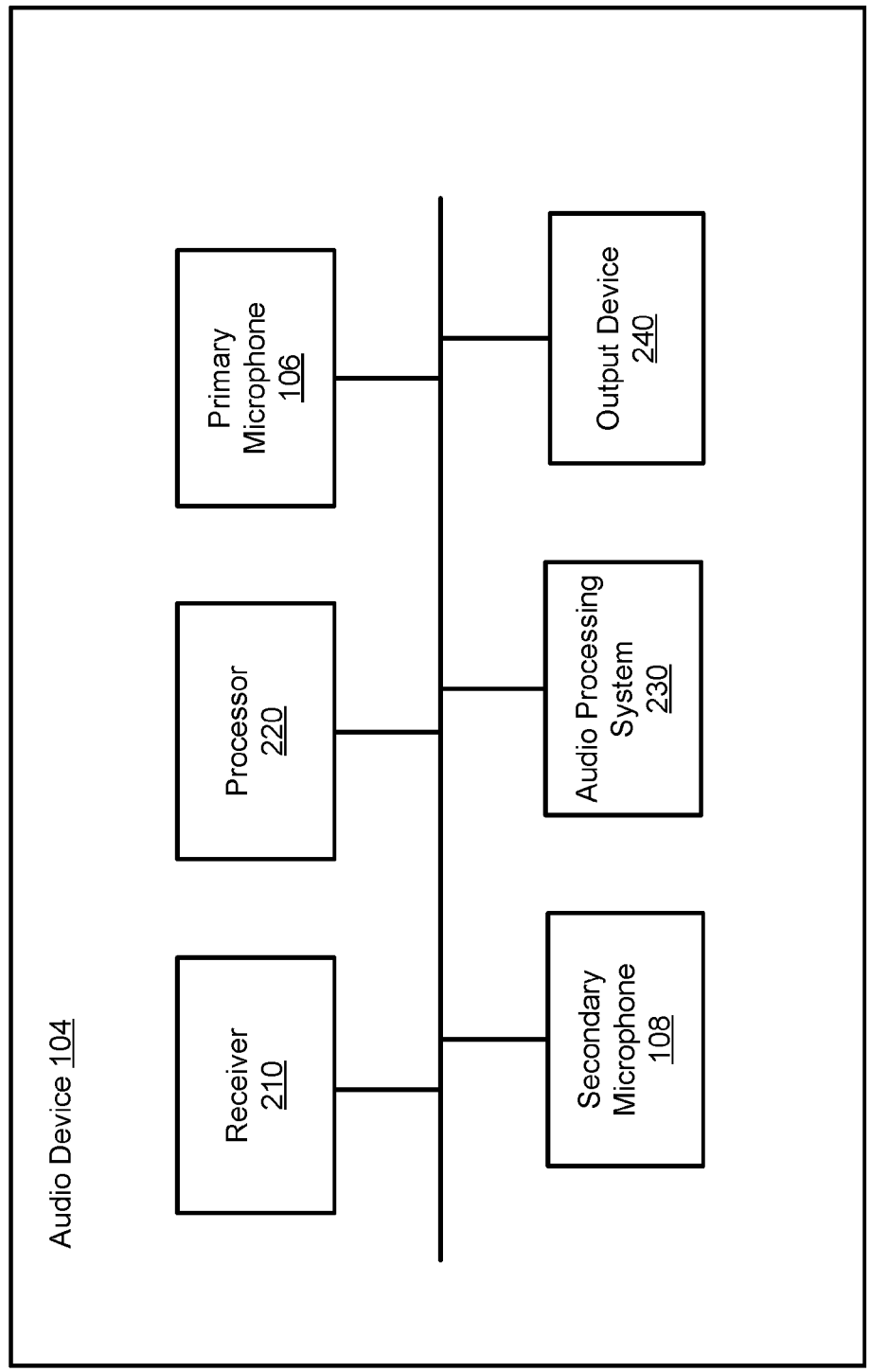
FIG. 2 is a block diagram of an exemplary audio device.

FIG. 2 is a block diagram of an exemplary audio device. In some embodiments, the audio device of FIG. 2 provides more detail for audio device 104 of FIG. 1.

In the illustrated embodiment, the audio device 104 includes a receiver 210, a processor 220, the primary microphone 106, an optional secondary microphone 108, an audio processing system 230, and an output device 240. The audio device 104 may include further or other components needed for audio device 104 operations. Similarly, the audio device 104 may include fewer components that perform similar or equivalent functions to those depicted in FIG. 2.

Processor 220 may execute instructions and modules stored in a memory (not illustrated in FIG. 2) in the audio device 104 to perform functionality described herein, including noise reduction for an acoustic signal. Processor 220 may include hardware and software implemented as a processing unit, which may process floating point operations and other operations for the processor 220.

The exemplary receiver 210 is an acoustic sensor configured to receive a signal from a communications network. In some embodiments, the receiver 210 may include an antenna device. The signal may then be forwarded to the audio processing system 230 to reduce noise using the techniques described herein, and provide an audio signal to the output device 240. The present technology may be used in one or both of the transmitting and receiving paths of the audio device 104.

The audio processing system 230 is configured to receive the acoustic signals from an acoustic source via the primary microphone 106 and secondary microphone 108 and process the acoustic signals. Processing may include performing noise reduction within an acoustic signal. The audio processing system 230 is discussed in more detail below. The primary and secondary microphones 106, 108 may be spaced a distance apart in order to allow for detecting an energy level difference, time difference, or phase difference between them. The acoustic signals received by primary microphone 106 and secondary microphone 108 may be converted into electrical signals (i.e., a primary electrical signal and a secondary electrical signal). The electrical signals may themselves be converted by an analog-to-digital converter (not shown) into digital signals for processing, in accordance with some embodiments. In order to differentiate the acoustic signals for clarity purposes, the acoustic signal received by the primary microphone 106 is herein referred to as the primary acoustic signal, while the acoustic signal received from by the secondary microphone 108 is herein referred to as the secondary acoustic signal. The primary acoustic signal and the secondary acoustic signal may be processed by the audio processing system 230 to produce a signal with an improved signal-to-noise ratio. It should be noted that embodiments of the technology described herein may be practiced utilizing only the primary microphone 106.

The output device 240 is any device that provides an audio output to the user. For example, the output device 240 may include a speaker, an earpiece of a headset or handset, or a speaker on a conference device.

In various embodiments, where the primary and secondary microphones 106 and 108 are omni-directional microphones that are closely-spaced (e.g., 1-2 cm apart), a beamforming technique may be used to simulate forwards-facing and backwards-facing directional microphones. The level difference may be used to discriminate speech and noise in the time-frequency domain, which can be used in noise reduction.

Figure 3:
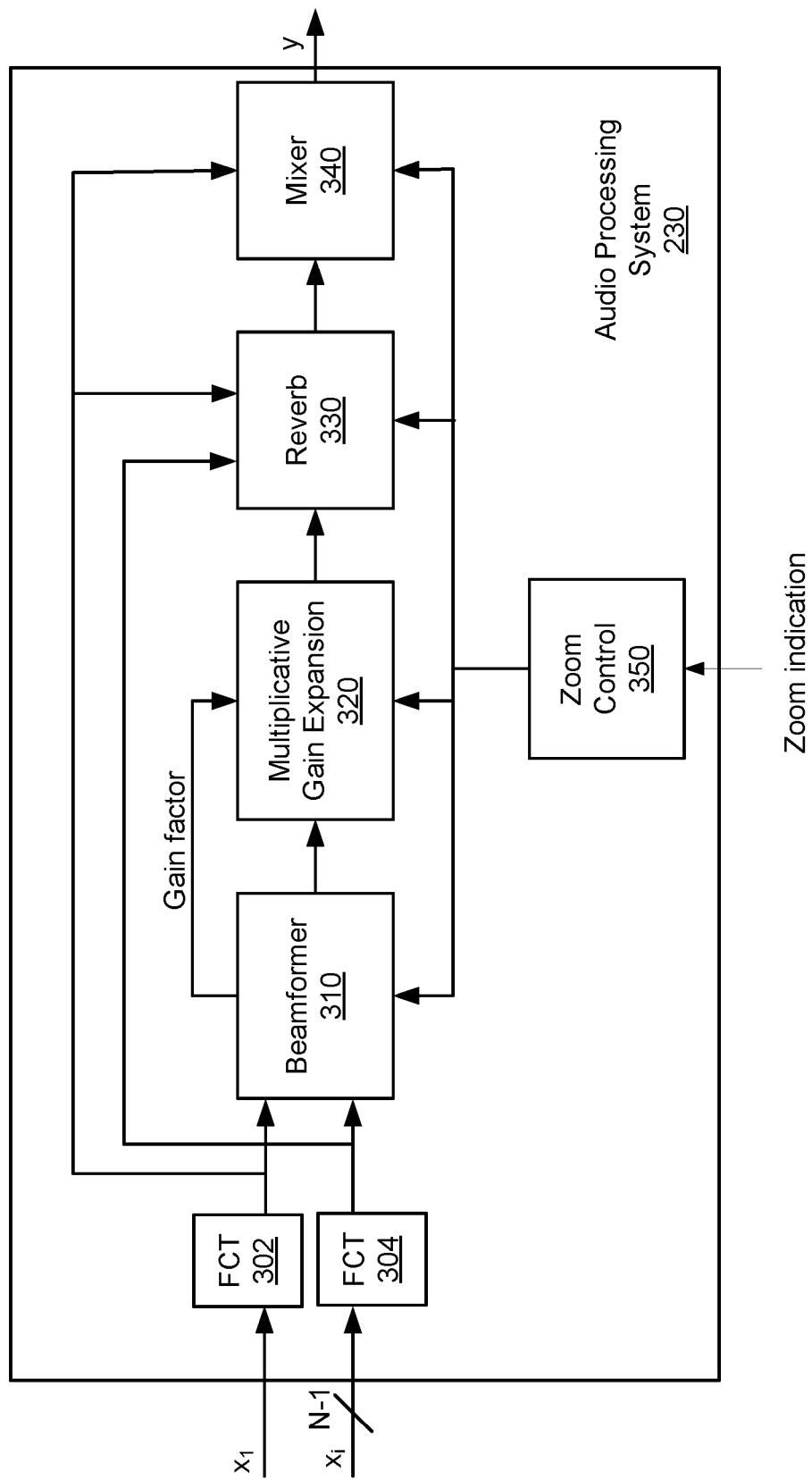
FIG. 3 is a block diagram of an exemplary audio processing system.

FIG. 3 is a block diagram of an exemplary audio processing system. The block diagram of FIG. 3 provides more detail for the audio processing system 230 in the block diagram of FIG. 2. Audio processing system 230 includes fast cosine transform (FCT) modules 302 and 304, beam former module 310, multiplicative gain expansion module 320, reverb module 330, mixer module 340, and zoom control module 350.

FCT modules 302 and 304 may receive acoustic signals from audio device microphones and convert the acoustic signals to frequency range sub-band signals. In some embodiments, FCT modules 302 and 304 are implemented as one or more modules that create one or more sub-band signals for each received microphone signal. FCT modules 302 and 304 receive an acoustic signal from each microphone contained in audio device 104. These received signals are illustrated as signals $X_1$-$X_I$, wherein $X_1$ is a primary microphone signal and $X_I$ represents the remaining microphone signals. In some embodiments, the audio processing system 230 of FIG. 3 performs an audio zoom on a per frame and per sub band basis.

In some embodiments, beam former module 310 receives the frequency sub-band signals as well as a zoom indication signal. The zoom indication is received from zoom control module 350. The zoom indication communicated by zoom indicator signal K may be generated in response to user input, analysis of a primary microphone signal or other acoustic signals received by audio device 104, a video zoom feature selection, or some other data. In operation, beam former module 310 receives sub-band signals, processes the sub-band signals to identify which signals are within a particular area to enhance (or "zoom"), and provides data for the selected signals as output to multiplicative gain expansion module 320. The output may include sub-band signals for the audio source within the area to enhance. Beam former module 310 also provides a gain factor to multiplicative gain expansion module 320. The gain factor may indicate whether multiplicative gain expansion module 320 should perform additional gain or reduction to the signals received from beam former module 310. In some embodiments, the gain factor is generated as an energy ratio based on the received microphone signals and components. The gain indication output by beam former module 310 may be a ratio of how much energy is reduced in the signal from the primary microphone versus the energy in the signals from the other microphones. Hence, the gain may be a boost or cancellation gain expansion factor. The gain factor is discussed in more detail below.

Beam former module 310 can be implemented as a null processing noise subtraction (NPNS) module, multiplicative module, or a combination of these modules. When an NPNS module is used in microphones to generate a beam and achieve beam forming, the beam is focused by narrowing constraints of alpha and gamma. For a rider beam, the constraints may be made larger. Hence, a beam may be manipulated by putting a protective range around the preferred direction. Beam former module 310 may be implemented by a system described in the U.S. Patent Application No. 61/325,764, entitled "Multi-Microphone Robust Noise Suppression System," the disclosure of which is incorporated herein by reference. Additional techniques for reducing undesired audio components of a signal are discussed in U.S. patent application Ser. No. 12/693,998 (now U.S. Pat. No. 8,718,290), entitled "Adaptive Noise Reduction Using Level Cues," the disclosure of which is incorporated herein by reference.

Multiplicative gain expansion module 320 receives the sub-band signals associated with audio sources within the selected beam, the gain factor from beam former module 310, and the zoom indicator signal. Multiplicative gain expansion module 320 applies a multiplicative gain based on the gain factor received. In effect, multiplicative gain expansion module 320 filters the beam former signal provided by beam former module 310.

The gain factor may be implemented as one of several different energy ratios. For example, the energy ratio may be the ratio of a noise reduced signal to a primary acoustic signal received from a primary microphone, the ratio of a noise reduced signal and a detected noise component within the primary microphone signal, the ratio of a noise reduced signal and a secondary acoustic signal, or the ratio of a noise reduced signal compared to the intra level difference between a primary signal and another signal. The gain factors may be an indication of signal strength in a target direction versus all other directions. Put another way, the gain factor may be an indication of multiplicative expansions due, and whether additional expansion or subtraction should be performed at the multiplicative gain expansion module 320. Multiplicative gain expansion module 320 outputs the modified signal and provides signal to reverb module 330 (which may also function to de-reverb).

Reverb module 330 receives the sub-band signals output by multiplicative gain expansion module 320, as well as the microphone signals which were also received by beam former module 310, and performs reverberation or dereverberation to the sub-band signals output by multiplicative gain expansion module 320. Reverb module 330 may adjust a ratio of direct energy to remaining energy within a signal based on the zoom control indicator provided by zoom control module 350.

Adjusting the reverb for a signal may involve adjusting the energy of different components of the signal. An audio signal has several components in a frequency domain, including a direct component, early reflections, and a tail component. A direct component typically has the highest energy level, followed by a somewhat lower energy level of reflections within the signal. Also included within a very particular signal is a tail, which may include noise and other low energy data or low energy audio. A reverberation is defined as reflections of the direct audio component. Hence, a reverberation with many reflections over a broad frequency range results in a more noticeable reverberation. A signal with fewer reflection components has a smaller reverberation component.

Typically, the further away a listener is from an audio source, the larger the reverberation in the signal, and the closer a listener is to an audio source, the smaller the intensity of the reverberation signal (reflection components). Hence, based on the zoom indicator received from zoom control module 350, reverb module 330 may adjust the reverberation components in the signal received from multiplicative gain expansion module 320. Hence, if the zoom indicator received indicates that a zoom in operation is to be performed on the audio, the reverberation will be decreased by minimizing the reflection components of the received signal. If the zoom indicator indicates that a zoom out is to be performed on the audio signal, the early reflection components are gained to increase these components to make it appear as if there is additional reverberation within the signal. After adjusting the reverberation of the received signal, reverb module 330 provides the modified signal to mixer module 340.

The mixer module 340 receives the reverberation adjusted signal and mixes the signal with the signal from the primary microphone. In some embodiments, mixer module 340 increases the energy of the signal appropriately when there is audio present in the frame and decreases it where there is little audio energy present in the frame.

Figure 4:
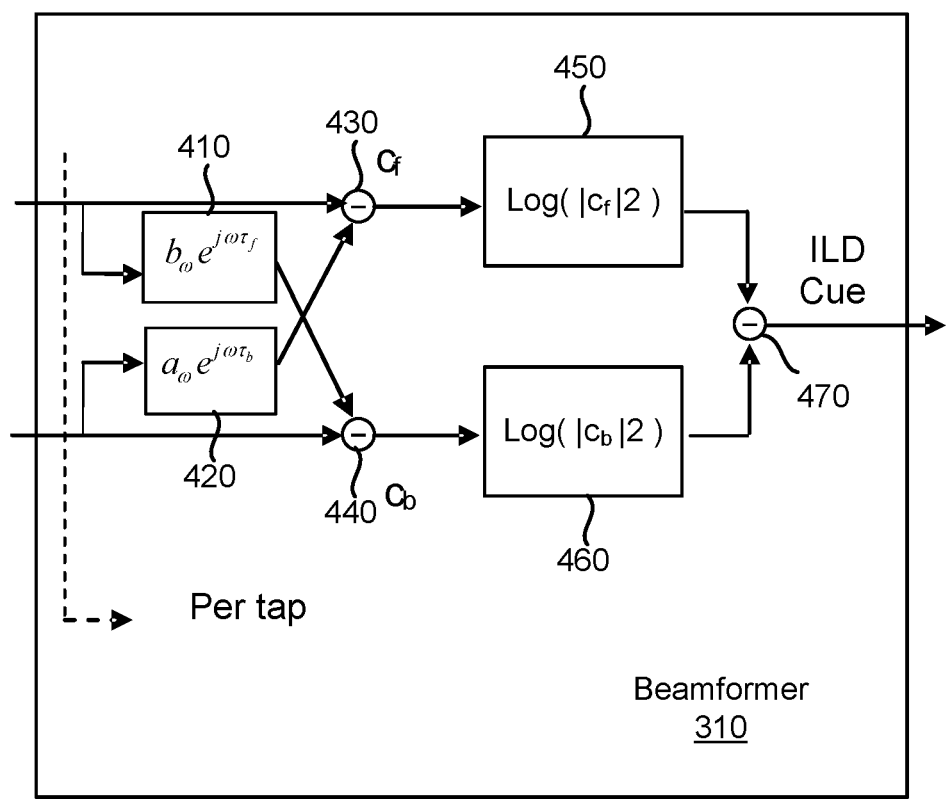
FIG. 4 is a block diagram of an exemplary beam former module.

FIG. 4 is a block diagram of an exemplary beam former module. The beam former module 310 may be implemented per tap (i.e., per sub-band). Beam former module 310 receives FCT output signals for a first microphone (such as a primary microphone) and a second microphone. The first microphone FCT signal is processed by module 410 according to the function:

$$b_\omega e^{j\omega\tau_f}$$

to generate a first differential array with parameters.

The secondary microphone FCT signal is processed by module 420 according to the function:

$$a_\omega e^{j\omega\tau_b}$$

to generate a second differential array with parameters. Further details regarding the generation of exemplary first and second differential arrays are described in the U.S. patent application Ser. No. 11/699,732,764, entitled "System and Method for Utilizing Omni-Directional Microphones for Speech Enhancement," now U.S. Pat. No. 8,194,880, issued Jun. 5, 2012, the disclosure of which is incorporated herein by reference.

The output of module 410 is then subtracted from the secondary microphone FCT signal at combiner 440 and the output of module 420 is then subtracted by the primary microphone FCT signal at combiner 430. A cardioid signal Cf is output from combiner 430 and provided to module 450 where the following function is applied:

$$\text{Log}(|Cf|^2).$$

A cardioid signal Cb is output from combiner 440 and provided to module 460 where the following function is applied:

$$\text{Log}(|Cb|^2).$$

The difference of the outputs of modules 450 and 460 is determined by element 470 and output as an ILD cue. The ILD cue may be output by beam former module 310 to a post filter (for example, a filter implemented by multiplicative gain expansion module 320).

Figure 5:
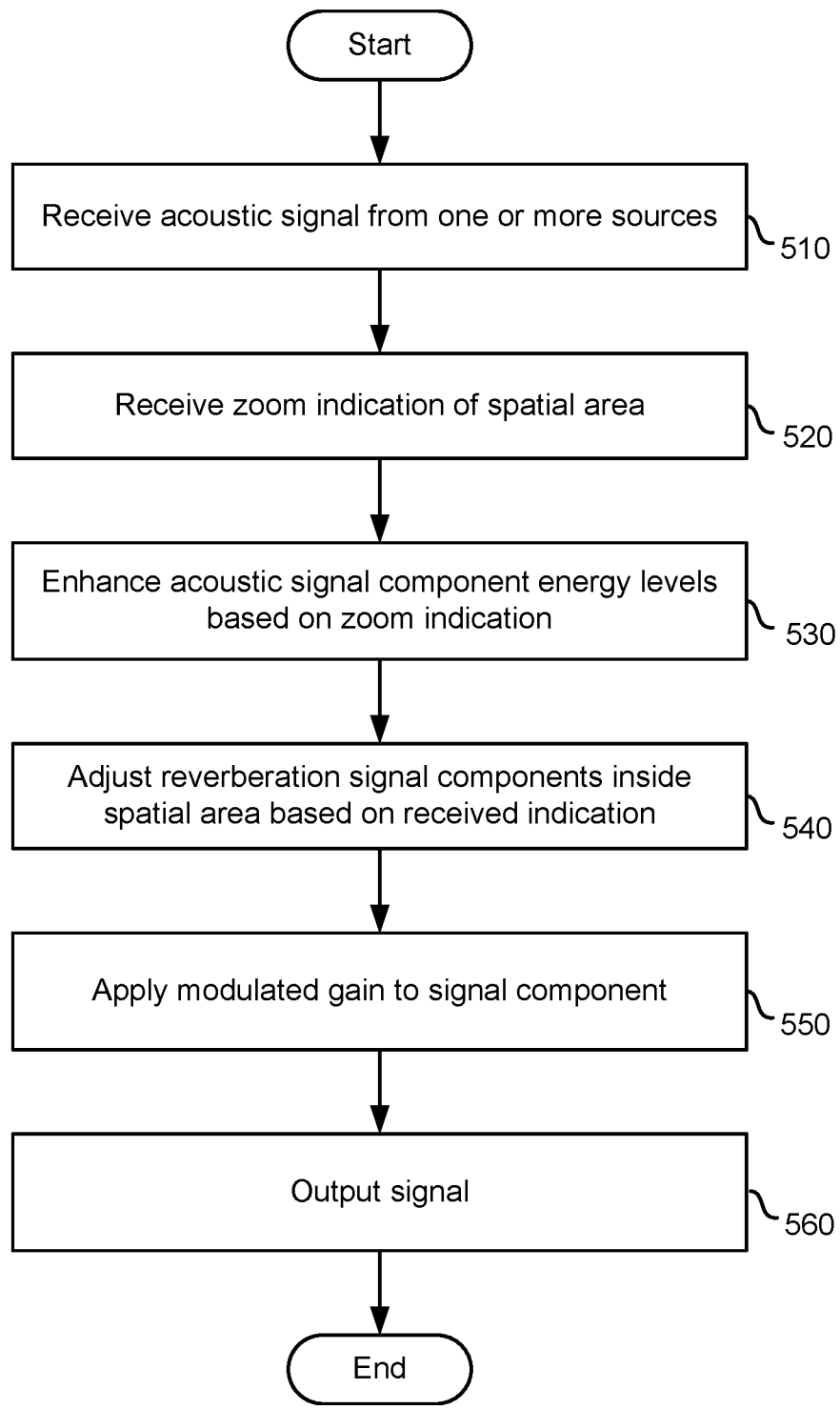
FIG. 5 is a flow chart of an exemplary method for performing an audio zoom.

FIG. 5 is a flow chart of an exemplary method for performing an audio zoom. An acoustic signal is received from one or more sources at step 510. In some embodiments, the acoustic signals are received through one or more microphones on audio device 104. For example, acoustic signals from audio sources 112-116 and reflections 128-129 are received through microphones 106 and 108 of audio device 104.

A zoom indication is then received for a spatial area at step 520. In some embodiments, the zoom indication is received from a user or determined based on other data. For example, the zoom indication is received from a user via a video zoom setting, pointing an audio device in a particular direction, an input for video zoom, or in some other manner.

Acoustic signal component energy levels are enhanced based on the zoom indication at step 530. In some embodiments, acoustic signal component energy levels are enhanced by increasing the energy levels for audio source sub-band signals that originate from a source device within a selected beam area. Audio signals from a device outside a selected beam area are de-emphasized. Enhancing acoustic signal component energy levels is discussed in more detail below with respect to the method of FIG. 6.

Reverberation signal components associated with a position inside the spatial area are adjusted based on the received indication at step 540. As discussed above, the adjustments may include modifying the ratio of a direct component with respect to reflection components for the particular signal. When a zoom in function is to be performed, reverberation should be decreased by increasing the ratio of the direct component to the reflection components in the audio signal. When a zoom out function is performed for the audio signal, the direct component is reduced with respect to the reflection components to decrease the ratio of direct to reflection components of the audio signal.

A modulated gain is applied to the signal component at step 550. The gain may be applied by mixing a reverb processed acoustic signal with a primary acoustic signal (or another audio signal received by audio device 104). The mixed signal that has been processed by audio zoom is output at step 560.

Figure 6:
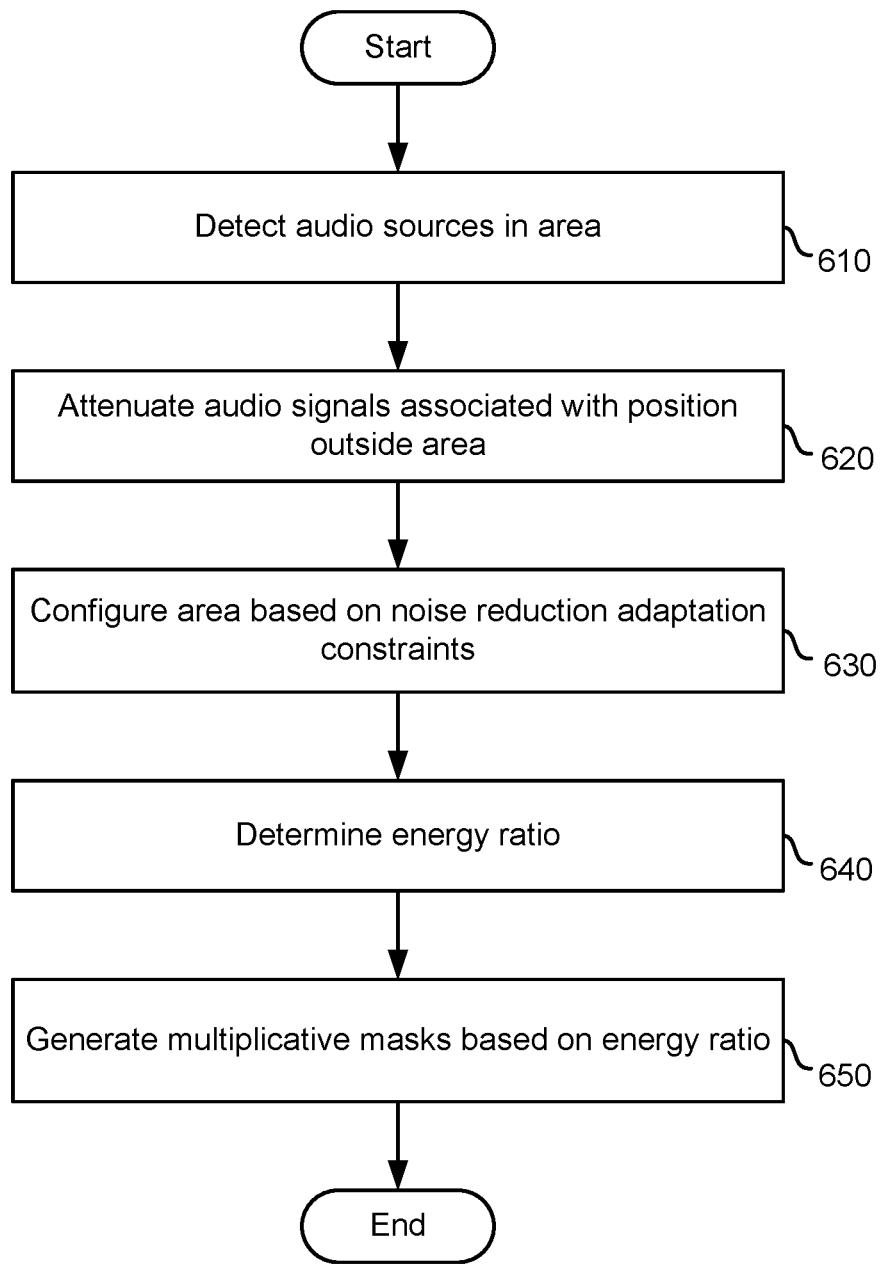
FIG. 6 is a flow chart of an exemplary method for enhancing acoustic signal components.

As discussed above, sub-band signals are enhanced based on a zoom indication. FIG. 6 is a flow chart of an exemplary method for enhancing acoustic signal components. In some embodiments, the method in FIG. 6 provides more detail for step 530 of the method in FIG. 5. An audio source is detected in the direction of a beam at step 610. This detection may be performed by a null-processing noise subtraction mechanism or some other module that is able to identify a spatial position of a source based on audio signals received by two or more microphones.

Acoustic signal sources located outside the spatial area are attenuated at step 620. In various embodiments, the acoustic sources outside the spatial area include certain audio sources (e.g., 112 in FIG. 1) and reflected audio signals such as reflections 128 and 129. Adaptation constraints are then used to steer the beam based on the zoom indication at step 630. In some embodiments, the adaptation constraints include a and a constraints used in a null processing noise suppression system. The adaptation constraints may also be derived from multiplicative expansion or selection of a region around a preferred direction based on a beam pattern.

Energy ratios are then determined at step 640. The energy ratios may be used to derive multiplicative masks that boost or reduce a beam former cancellation gain for signal components. Next, multiplicative masks are generated based on energy ratios at step 650. Generating multiplicative masks based on an energy ratio is discussed in more detail below with respect to the method of FIG. 7.

Figure 7:
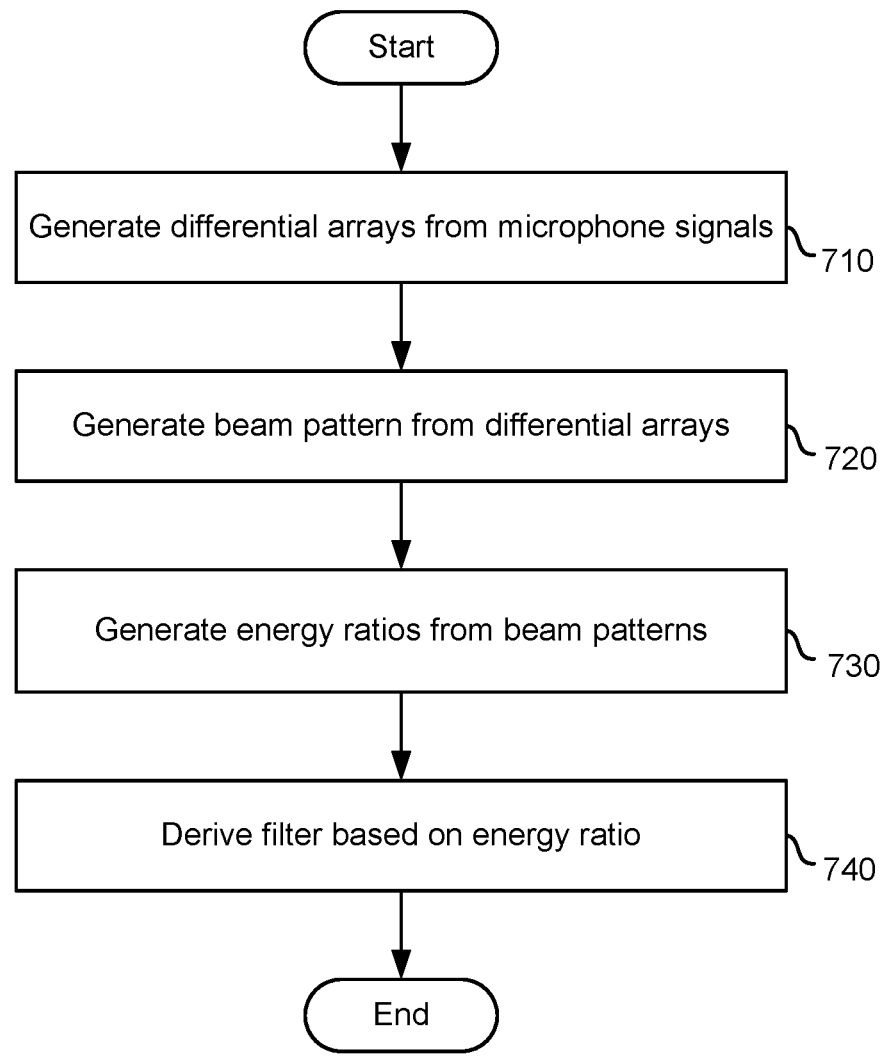
FIG. 7 is a flow chart of an exemplary method for generating a multiplicative mask.

FIG. 7 is a flow chart of an exemplary method for generating a multiplicative mask. The method of FIG. 7 provides more detail for step 650 in the method of FIG. 6. Differential arrays are generated from microphone signals at step 710. The arrays may be generated as part of a beam former module 310. The beam pattern may be a cardiod pattern generated based at least in part from the differential output signals. Next, a beam pattern is generated from the differential arrays at step 720. Energy ratios are then generated from beam patterns at step 730. The energy ratios may be generated as any of a combination of signals. Once generated, an ILD map may be generated per frequency from energy ratios. An ILD range corresponding to the desired selection may be selected. An ILD window may then be applied to a map by boosting the signal components within the window and attenuating the signal components positioned outside the window. A filter, such as a post filter, may be derived from the energy ratio at step 740.

The above described modules, including those discussed with respect to FIG. 3, may include instructions stored in a storage media such as a machine readable medium (e.g., computer readable medium). These instructions may be retrieved and executed by the processor 220 to perform the functionality discussed herein. Some examples of instructions include software, program code, and firmware. Some examples of storage media include memory devices and integrated circuits.

Figure 8:
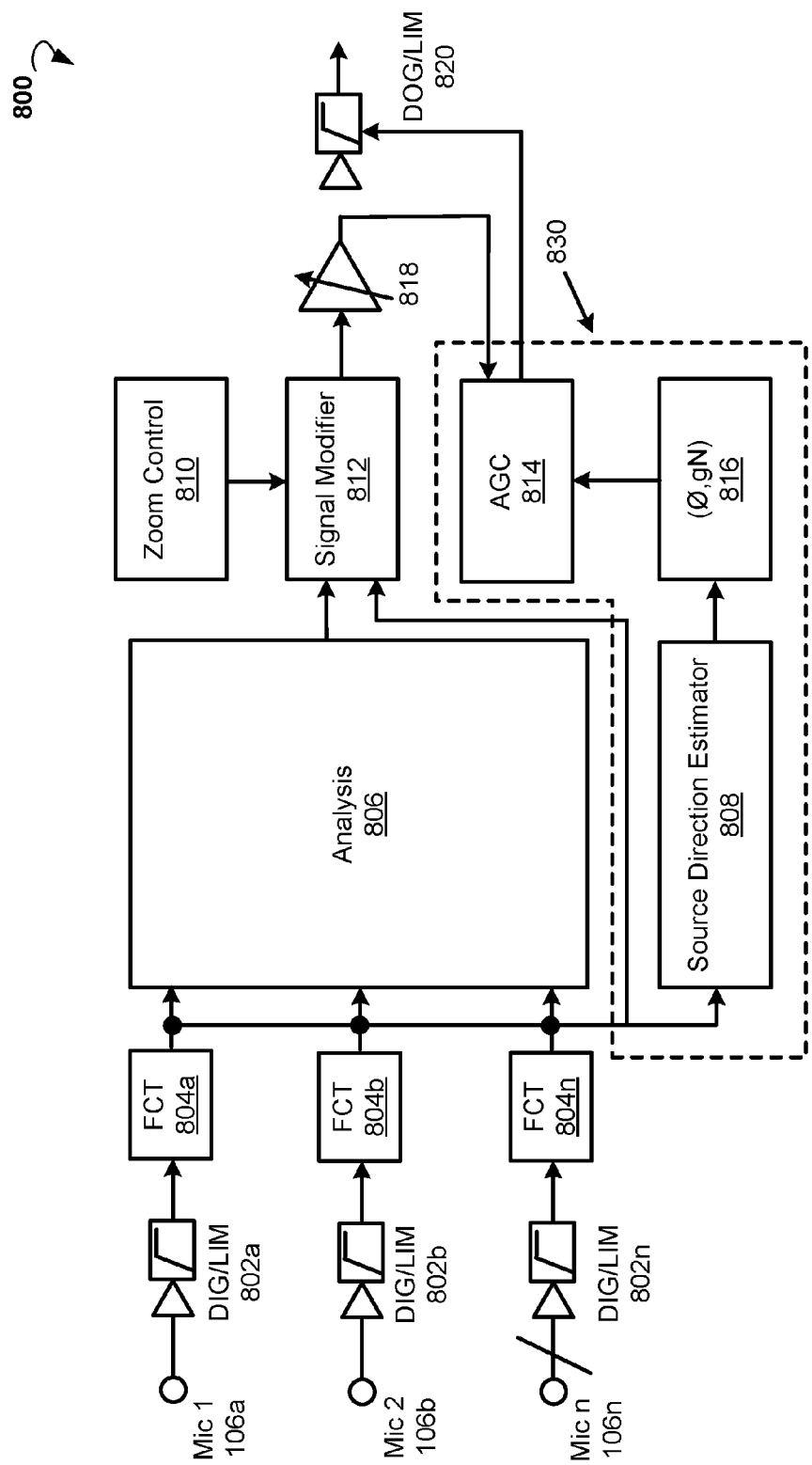
FIG. 8 is a block diagram of an exemplary audio processing system suitable for improving performance of directional audio capture.

FIG. 8 is a block diagram illustrating an audio processing system 800, according to another example embodiment. The example audio processing system 800 includes a source estimation subsystem 830 coupled to various elements of an example AZA subsystem. The example AZA subsystem includes limiters 802a, 802b, . . . , and 802n, FCT modules 804a, 804b, . . . , and 804n, analysis module 806, zoom control module 810, signal modifier 812, element 818, and a limiter 820. The source estimation subsystem 830 may include a source direction estimator (SDE) module 808, also referred to as a target estimator, a gain module 816, and an automatic gain control (AGC) module 814. The example audio processing system 800 processes acoustic audio signal from microphones 106a, 106b, . . . , and 106n.

In various exemplary embodiments, SDE module 808 is operable to localize a source of sound. The SDE module 808 may generate cues based on correlation of phase plots between different microphone inputs. Based on the correlation of the phase plots, the example SDE module 808 can compute a vector of salience estimates at different angles. Based on the salience estimates, the SDE module 808 can determine a direction of the source. In other words, according to various embodiments, a peak in the vector of salience estimates is an indication of direction of source in a particular direction. At the same time, sources of diffused nature, i.e., non-directional, may be represented by poor salience estimates at all the angles. Various embodiments may rely upon the cues (estimates of salience) to improve the performance of an existing directional audio solution, which is carried out by the analysis module 806, signal modifier 812, and zoom control module 810.

According to an example embodiment, estimates of salience are used to localize the angle of the source in the range of 0 to 360 degrees in a plane parallel to the ground, when, for example, the audio device 104 is placed on a table top. The estimates of salience can be used to attenuate/amplify the signals at different angles as required by the customer/user.

In various embodiments, the SDE module 808 is configured to operate in two and more modes. The modes of operation can include "normal," "noisy," and "simultaneous talkers." The characterization of these modes is driven by a SDE salience parameter.

Normal Mode

A "normal" mode of operation is defined by a single directional speech source without the presence of any kind of strong speech distractors with or without the presence of noise. A vector of salience estimates in such case can be characterized by a single peak (above a salience threshold). The single peak can indicate a presence of a single source of sound. The location of the peak, in the vector of salience estimates, may characterize the angle of the source. In such cases, both a diffused source detector and a simultaneous talker detector may be set to a no state. Based on these states, the target estimator, in various embodiments, drives the level of suppression/amplification as desired by the user on a per angle basis.

In some embodiments, the target estimator generates a mapping of angle to relative levels of attenuation in the AZA subsystem. For example, a range of angles 240-270 degrees may require 10 dB of incremental suppression relative to AZA's performance target estimator containing an array with 0 dB throughout except for the entries between 240 and 270 degrees.

Although an immediate relative suppression level of 10 dB is achievable on detection, in a real time speech system, such suppression may cause audible distortion to a listener due to sudden jumps in signal levels. In some embodiments, to alleviate the distortion problem, the AGC module 814 can control the rate of roll-off by means of attack and release time constants. A smooth roll-off can effectively stabilize the speech system without audible distortions in the audio. In some embodiments, noise, if present along with the directional speech, is alleviated by the AZA subsystem.

Noisy Mode

A noisy mode of operation can be characterized by a diffused noise source with no directional speech. The noisy mode can result in poor salience estimates for all angles. Since there is no directional information of the source of such data, the signal can be processed solely by the AZA subsystem. In some embodiments, interactions between the noisy mode and the normal mode of operations are handled smoothly without sudden switch overs to avoid pumping or any gain related artifacts. For a smooth handover, a target estimator can provide a target of 0 dB to the AGC module 814. By appropriately handling the attack and release time, a smooth handover can be achieved. It should be noted, however, that the attack and release time in the noisy mode are different from the attack and release time used in the normal mode.

Simultaneous Talkers Mode

A simultaneous talkers mode is characterized by simultaneous multiple talkers/side distractors either with or without noise. The salience vector for the simultaneous talkers mode can be characterized by multiple peaks (above a salience threshold). The simultaneous talkers mode can be handled in a way similar to the noisy mode. When SDE module operates in the simultaneous talkers mode, acoustic signals from the microphones can be processed solely by the AZA subsystem. In various embodiments, a handover between the above modes can be carried out in a gracious manner with the help of the AGC subsystem.

Various embodiments of the technology described herein, having the AZA subsystem augmented with a source estimation subsystem, can avoid the problem of microphone sealing by ignoring any inter-microphone signal level differences. Various embodiments focus instead on the time of arrival/phase cues between the microphones. However, it should be noted that even though various embodiments can be insensitive to the microphone sealing, the underlying AZA sub-system may still be sensitive to the microphone sealing, and therefore the overall system performance may depend on the microphone sealing. In some embodiments, to alleviate the microphone sealing problem, an AZA sub-system may be tuned based on characteristics of the sealing of the microphones utilized to reduce the sensitivity on the microphone sealing. Further details regarding exemplary tuning of the AZA sub-system may be found in U.S. patent application Ser. No. 12/896,725, filed Oct. 1, 2010, incorporated by reference herein.

Various embodiments of the present technology may utilize the fact that SDE salience varies very little with the change of a distance between a talker/speaker and an audio device, when the distance is in the range of 0.5 m-2 m and the speaker's mouth is at around 30 cm above the audio device. This can make the audio processing system 800 more robust to the distance variance and can result in an even/similar performance for a talker talking at these distances. In some embodiments, the AZA subsystem may be tuned to take full-advantage of the robustness to the distance.

The target estimator block (also referred to as SDE module) 808 can provide relative levels of suppression based on the angle of arrival of sounds independently of the AZA subsystem. In some embodiments, the target estimator block can be controlled independently without any interactions with other subsystems. This independently controllable (e.g. "island") architecture can empower the field tuning engineers to match the performance desired by a customer/user.

As described regarding various embodiments, the array of the target estimators during the "normal" mode of operation provides a powerful tool which can allow implementing the above architecture by manipulating the angle of the suppression level array in the target-estimator block.

Figure 9:
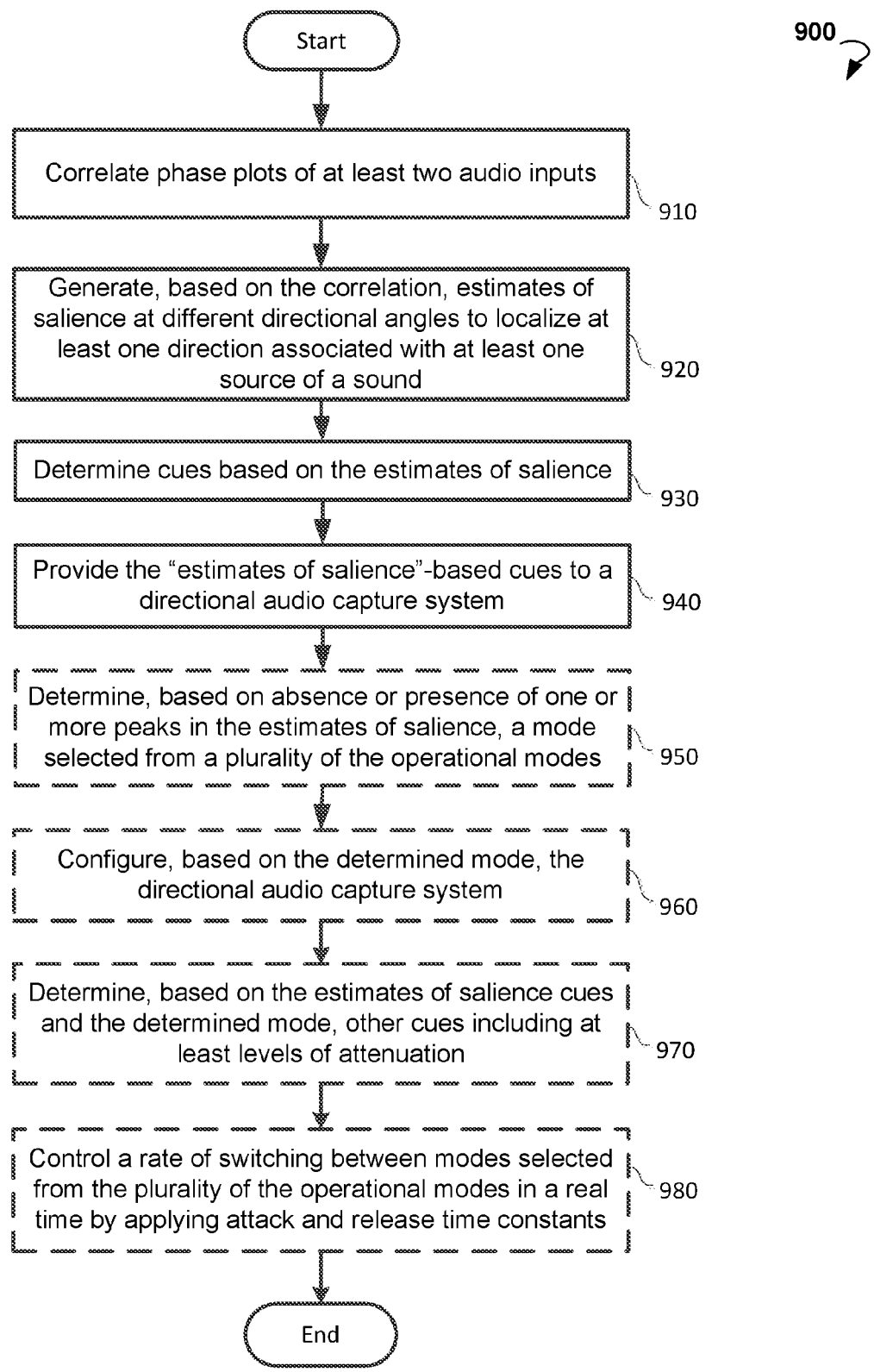
FIG. 9 is a flow chart of an exemplary method for improving performance of directional audio capture.

FIG. 9 is a flow chart showing steps of a method 900 of improving performance of directional audio capture system, according to an example embodiment. In block 910, the example method 900 includes correlating phase plots of at least two audio inputs. In some embodiments, the audio inputs can be captured by at least two microphones having different sealing.

In block 920, the example method 900 allows generating, based on the correlation, estimates of salience at different directional angles to localize at least one direction associated with at least one source of a sound. In some embodiments, the estimates of salience include a vector of saliences at directional angles from 0 to 360 in a plane parallel to a ground.

In block 930, the example method 900 includes determining cues based on the estimates of salience. In block 940, the example method 900 includes providing those "estimates of salience"-based cues to a directional audio capture system.

In further embodiments, the example method 900 includes determining, based on the estimates of salience (e.g., absence or presence of one or more peaks in the estimates of salience), a mode from a plurality of the operational modes. In certain embodiments, the operational modes include a "normal" mode characterized by a single directional speech source, a "simultaneous talkers" mode characterized by the presence of at least two single directional speech sources, and a noisy mode characterized by a diffused noise source with no directional speech.

In block 960, the example method 900 includes configuring, based on the determined mode, the directional audio capture system.

In block 970, the example method 900 includes determining, based on the estimates of salience and the determined mode, other cues including at least levels of attenuation.

In block 980, the example method 900 includes controlling a rate of switching between modes from the plurality of the operational modes in real time by applying attack and release time constants.

Figure 10:
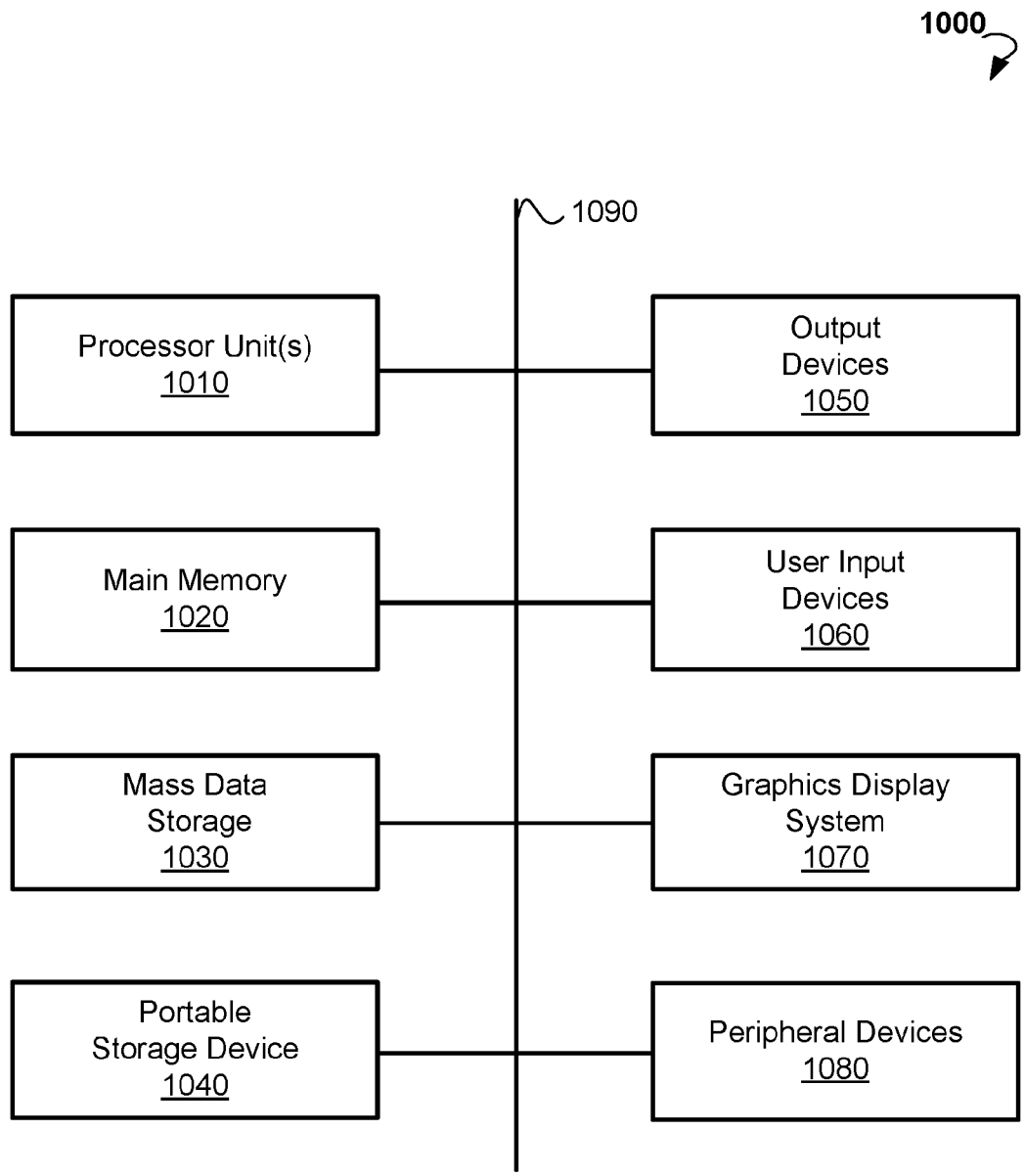
FIG. 10 is a computer system that can be used to implement methods disclosed herein, according to various example embodiments.

FIG. 10 illustrates an exemplary computer system 1000 that may be used to implement some embodiments of the present disclosure. The computer system 1000 of FIG. 10 may be implemented in the contexts of the likes of computing systems, networks, servers, or combinations thereof. The computer system 1000 of FIG. 10 includes one or more processor units 1010 and main memory 1020. Main memory 1020 stores, in part, instructions and data for execution by processor units 1010. Main memory 1020 stores the executable code when in operation, in this example. The computer system 1000 of FIG. 10 further includes a mass data storage 1030, portable storage device 1040, output devices 1050, user input devices 1060, a graphics display system 1070, and peripheral devices 1080.

The components shown in FIG. 10 are depicted as being connected via a single bus 1090. The components may be connected through one or more data transport means. Processor unit 1010 and main memory 1020 are connected via a local microprocessor bus, and the mass data storage 1030, peripheral device(s) 1080, portable storage device 1040, and graphics display system 1070 are connected via one or more input/output (I/O) buses.

Mass data storage 1030, which can be implemented with a magnetic disk drive, solid state drive, or an optical disk drive, is a non-volatile storage device for storing data and instructions for use by processor unit 1010. Mass data storage 1030 stores the system software for implementing embodiments of the present disclosure for purposes of loading that software into main memory 1020.

Portable storage device 1040 operates in conjunction with a portable non-volatile storage medium, such as a flash drive, floppy disk, compact disk, digital video disc, or Universal Serial Bus (USB) storage device, to input and output data and code to and from the computer system 1000 of FIG. 10. The system software for implementing embodiments of the present disclosure is stored on such a portable medium and input to the computer system 1000 via the portable storage device 1040.

User input devices 1060 can provide a portion of a user interface. User input devices 1060 may include one or more microphones, an alphanumeric keypad, such as a keyboard, for inputting alphanumeric and other information, or a pointing device, such as a mouse, a trackball, stylus, or cursor direction keys. User input devices 1060 can also include a touchscreen. Additionally, the computer system 1000 as shown in FIG. 10 includes output devices 1050. Suitable output devices 1050 include speakers, printers, network interfaces, and monitors.

Graphics display system 1070 include a liquid crystal display (LCD) or other suitable display device. Graphics display system 1070 is configurable to receive textual and graphical information and process the information for output to the display device.

Peripheral devices 1080 may include any type of computer support device to add additional functionality to the computer system.

The components provided in the computer system 1000 of FIG. 10 are those typically found in computer systems that may be suitable for use with embodiments of the present disclosure and are intended to represent a broad category of such computer components that are well known in the art. Thus, the computer system 1000 of FIG. 10 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 1000 is implemented as a cloud-based computing environment, such as a virtual machine operating within a computing cloud. In other embodiments, the computer system 1000 may itself include a cloud-based computing environment, where the functionalities of the computer system 1000 are executed in a distributed fashion. Thus, the computer system 1000, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as the computer system 1000, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for improving performance of a directional audio capture system, the method comprising:
    correlating phase plots of at least two audio inputs;
    generating, based on the correlation, estimates of salience at different directional angles to localize at least one direction associated with at least one source of a sound;
    determining cues based on the estimates of salience;
    providing the cues to the directional audio capture system; and
    determining, based on the estimates of salience, a mode selected from a plurality of operational modes, the plurality of operational modes including a first operational mode wherein the at least one source of sound includes a single directional speech source.

2. The method of claim 1, wherein the cues are used by the directional audio capture system to attenuate or amplify the at least two audio inputs at the different directional angles.

3. The method of claim 1, wherein the cues include at least attenuation levels of the different directional angles.

4. The method of claim 1, wherein the estimates of salience include a vector of saliences at directional angles from 0 to 360 in a plane parallel to a ground.

5. The method of claim 1, wherein generating the cues includes mapping the different directional angles to relative levels of attenuation for the directional audio capture system.

6. The method of claim 5, further comprising controlling the rate of changing the levels of attenuation in a real time by attack and release time constants to avoid sound artifacts.

7. The method of claim 1, wherein the plurality of operational modes further includes a second operational mode wherein the at least one source of sound includes at least two single directional speech sources, and a third operational mode wherein the at least one source of sound includes a diffused noise source having no directional speech.

8. The method of claim 1, wherein determining the mode is based on absence or presence of one or more peaks in the estimates of salience.

9. The method of claim 8, further comprising configuring, based on the determined mode, the directional audio capture system.

10. The method of claim 1, further comprising controlling a rate of switching between modes from the plurality of the operational modes in a real time by applying attack and release time constants.

11. The method of claim 1, wherein the at least two audio inputs are captured by at least two microphones.

12. The method of claim 11, wherein one of the at least two microphones is sealed better than other ones of the at least two microphones.

13. A system for improving performance of a directional audio capture system, the system comprising:
    at least one processor; and
    a memory communicatively coupled with the at least one processor, the memory storing instructions, which when executed by the at least one processor performs a method comprising:

correlating phase plots of at least two audio inputs;

generating, based on the correlation, estimates of salience at different directional angles to localize at least one direction associated with at least one source of a sound;

determining cues based on the estimates of salience;

providing the cues to the directional audio capture system; and determining, based on absence or presence of one or more peaks in the estimates of salience, a mode selected from a plurality of operational modes, the plurality of operational modes including a first operational mode wherein the at least one source of sound includes a single directional speech source.

14. The system of claim 13, wherein the cues are used by the directional audio capture system to attenuate or amplify the at least two audio inputs at the different directional angles.

15. The system of claim 13, wherein the cues include at least attenuation levels for the different directional angles.

16. The system of claim 13, wherein generating the cues includes mapping the different directional angles to relative levels of attenuation for the directional audio capture system.

17. The system of claim 13, wherein the plurality of operational modes further includes a second operational mode wherein the at least one source of sound includes at least two single directional speech sources, and a third operational mode wherein the at least one source of sound includes a diffused noise source having no directional speech.

18. The system of claim 17, further comprising:

configuring, based on the determined mode, the directional audio capture system, and controlling a rate of switching between modes in a real time by applying attack and release time constants.

19. A non-transitory computer-readable storage medium having embodied thereon instructions, which when executed by at least one processor, perform steps of a method, the method comprising:

correlating phase plots of at least two audio inputs;

generating, based on the correlation, estimates of salience at different directional angles to localize at least one direction associated with at least one source of a sound;

determining cues based on the estimates of salience;

providing the cues to the directional audio capture system; and determining, based on absence or presence of one or more peaks in the estimates of salience, a mode selected from a plurality of operational modes, the plurality of operational modes including a first operational mode wherein the at least one source of sound includes a single directional speech source.

* * * * *